United States Patent
Khoshnevisan et al.

(10) Patent No.: US 11,432,319 B2
(45) Date of Patent: Aug. 30, 2022

(54) SIGNALING FOR NON-TRANSPARENT SINGLE FREQUENCY NETWORK SCHEMES FOR PDSCH

(71) Applicant: QUALCOMM Incorporated, San Diego, CA (US)

(72) Inventors: Mostafa Khoshnevisan, San Diego, CA (US); Xiaoxia Zhang, San Diego, CA (US); Tao Luo, San Diego, CA (US); Wooseok Nam, San Diego, CA (US); Sungwoo Park, Seoul (KR); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 17/170,160

(22) Filed: Feb. 8, 2021

(65) Prior Publication Data
US 2021/0259000 A1   Aug. 19, 2021

Related U.S. Application Data

(60) Provisional application No. 62/976,758, filed on Feb. 14, 2020.

(51) Int. Cl.
*H04W 72/12* (2009.01)
*H04W 72/04* (2009.01)
*H04L 5/00* (2006.01)

(52) U.S. Cl.
CPC ....... *H04W 72/1289* (2013.01); *H04L 5/0048* (2013.01); *H04W 72/042* (2013.01)

(58) Field of Classification Search
CPC ............ H04W 72/1289; H04W 72/042; H04L 5/0048
See application file for complete search history.

(56) References Cited

U.S. PATENT DOCUMENTS

| | | | | |
|---|---|---|---|---|
| 2014/0314041 | A1* | 10/2014 | Kim | H04L 25/0224 |
| 2020/0145967 | A1* | 5/2020 | Park | H04W 72/0426 |
| 2020/0396760 | A1* | 12/2020 | Yi | H04L 1/1864 |
| 2021/0014025 | A1* | 1/2021 | Gao | H04W 48/12 |

* cited by examiner

*Primary Examiner* — Ronald B Abelson
(74) *Attorney, Agent, or Firm* — Arent Fox, LLP

(57) ABSTRACT

A user equipment (UE) may receive a downlink control information (DCI) including an antenna port field and a transmission configuration indication (TCI) field for scheduling a physical downlink shared channel (PDSCH). The TCI field may indicate that two or more reference signals apply to two or more demodulation reference signal (DMRS) ports across all resource blocks and symbols for the PDSCH for at least one transmission layer of the PDSCH. The antenna port field may indicate a plurality of indicated DMRS ports. The UE may map two or more DMRS ports of the indicated DMRS ports to at least one transmission layer of the PDSCH. The UE may receive the at least one transmission layer of the PDSCH as a single-frequency-network (SFN) transmission based on the two or more reference signals and the two or more DMRS ports.

30 Claims, 12 Drawing Sheets

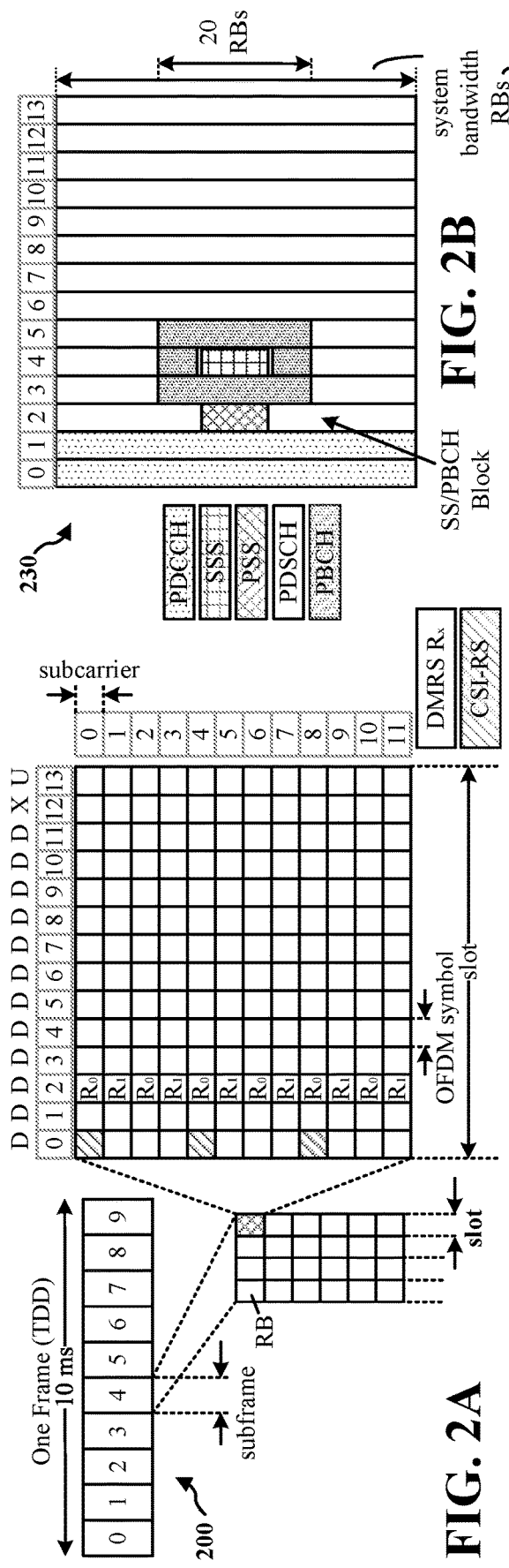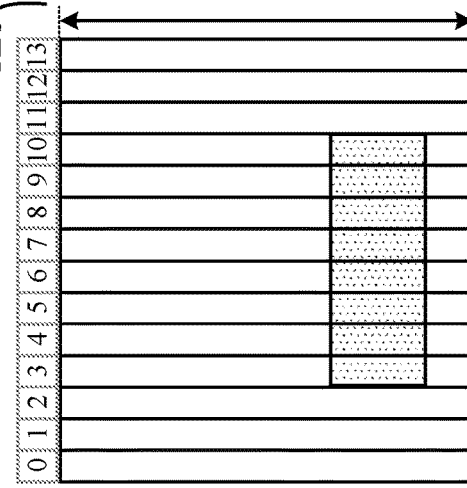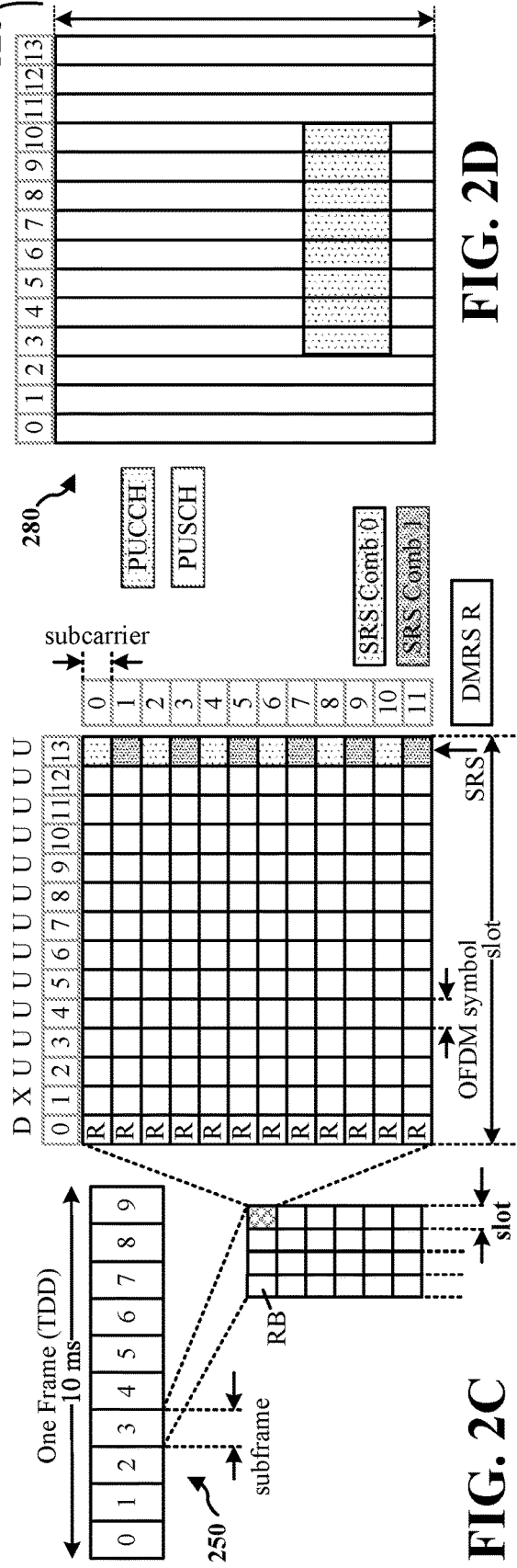

```
QCL-Info ::= SEQUENCE {
Cell        ServCellIndex
bwp-Id      BWP-Id
referenceSignal CHOICE {
    csi-rs      SEQUENCE (SIZE (1..maxNrofRSperQCLforSFN)) of NZP-CSI-RS-ResourceId,
    ssb         SEQUENCE (SIZE (1..maxNrofRSperQCLforSFN)) of SSB-Index
    },
qcl-Type    ENUMERATED {typeA, typeB, typeC, typeD, typeA-SFN, typeB-SFN,
            typeC-SFN, typeD-SFN},
...
}
```

1000

```
QCL-Info ::= SEQUENCE {
Cell        ServCellIndex
bwp-Id      BWP-Id
referenceSignal CHOICE {
    csi-rs      NZP-CSI-RS-ResourceId,
    ssb         SSB-Index
    },
referenceSignal CHOICE {
    csi-rs      NZP-CSI-RS-ResourceId,
    ssb         SSB-Index
    },
qcl-Type    ENUMERATED {typeA, typeB, typeC, typeD, typeA-SFN,
            typeB-SFN, typeC-SFN, typeD-SFN},
...
}
```

SIGNALING FOR NON-TRANSPARENT SINGLE FREQUENCY NETWORK SCHEMES FOR PDSCH

CROSS REFERENCE TO RELATED APPLICATIONS

This application claims priority to U.S. Provisional Application No. 62/976,758 titled "SIGNALING FOR NON-TRANSPARENT SINGLE FREQUENCY NETWORK SCHEMES FOR PDSCH," filed Feb. 14, 2020, which is assigned to the assignee hereof, and incorporated herein by reference in its entirety.

BACKGROUND

Technical Field

The present disclosure relates generally to communication systems, and more particularly, to apparatuses and methods of signaling parameters for single frequency network (SFN) transmissions of a physical downlink shared channel (PDSCH).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a user equipment (UE). The method may include receiving a downlink control information (DCI) including an antenna port field and a transmission configuration indication (TCI) field for scheduling a physical downlink shared channel (PDSCH). The TCI field may indicate that two or more reference signals apply to two or more demodulation reference signal (DMRS) ports across all resource blocks and symbols for the PDSCH for at least one transmission layer of the PDSCH. The antenna port field may indicate plurality of indicated DMRS ports. The method may include mapping, based on a mapping rule, the indicated DMRS ports to transmission layers of the PDSCH, wherein the mapping maps two or more DMRS ports to the at least one transmission layer of the PDSCH. The method may include receiving the at least one transmission layer of the PDSCH as a single-frequency-network (SFN) transmission based on the two or more reference signals and the two or more DMRS ports.

The disclosure also provides an apparatus (e.g., a UE) including a memory storing computer-executable instructions and at least one processor configured to execute the computer-executable instructions to perform the above method, an apparatus including means for performing the above method, and a computer-readable medium storing computer-executable instructions for performing the above method.

In another aspect, the disclosure provides a method of wireless communication for a base station. The method may include mapping two or more DMRS ports to at least one transmission layer of a PDSCH as a SFN transmission that applies two or more reference signals to the two or more DMRS ports across all resource blocks and symbols for the PDSCH for the at least one transmission layer of the PDSCH. The method may include transmitting a DCI for scheduling the PDSCH including an antenna port field that indicates a plurality of indicated DMRS ports including the two or more DMRS ports and a TCI field that indicates the at least two reference signals. The method may include transmitting the at least one layer of the PDSCH from two or more transmit-receive-points based on the two or more reference signals and the two or more DMRS ports.

The disclosure also provides an apparatus (e.g., a base station) including a memory storing computer-executable instructions and at least one processor configured to execute the computer-executable instructions to perform the above method, an apparatus including means for performing the above method, and a computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G NR frame.

FIG. 2B is a diagram illustrating an example of DL channels within a 5G NR subframe.

FIG. 2C is a diagram illustrating an example of a second 5G NR frame.

FIG. 2D is a diagram illustrating an example of UL channels within a 5G NR subframe.

FIG. 10 is a diagram of an example configuration of a quasi-co-location (QCL) information for indicating two or more reference signals.

DETAILED DESCRIPTION

Figure 1:
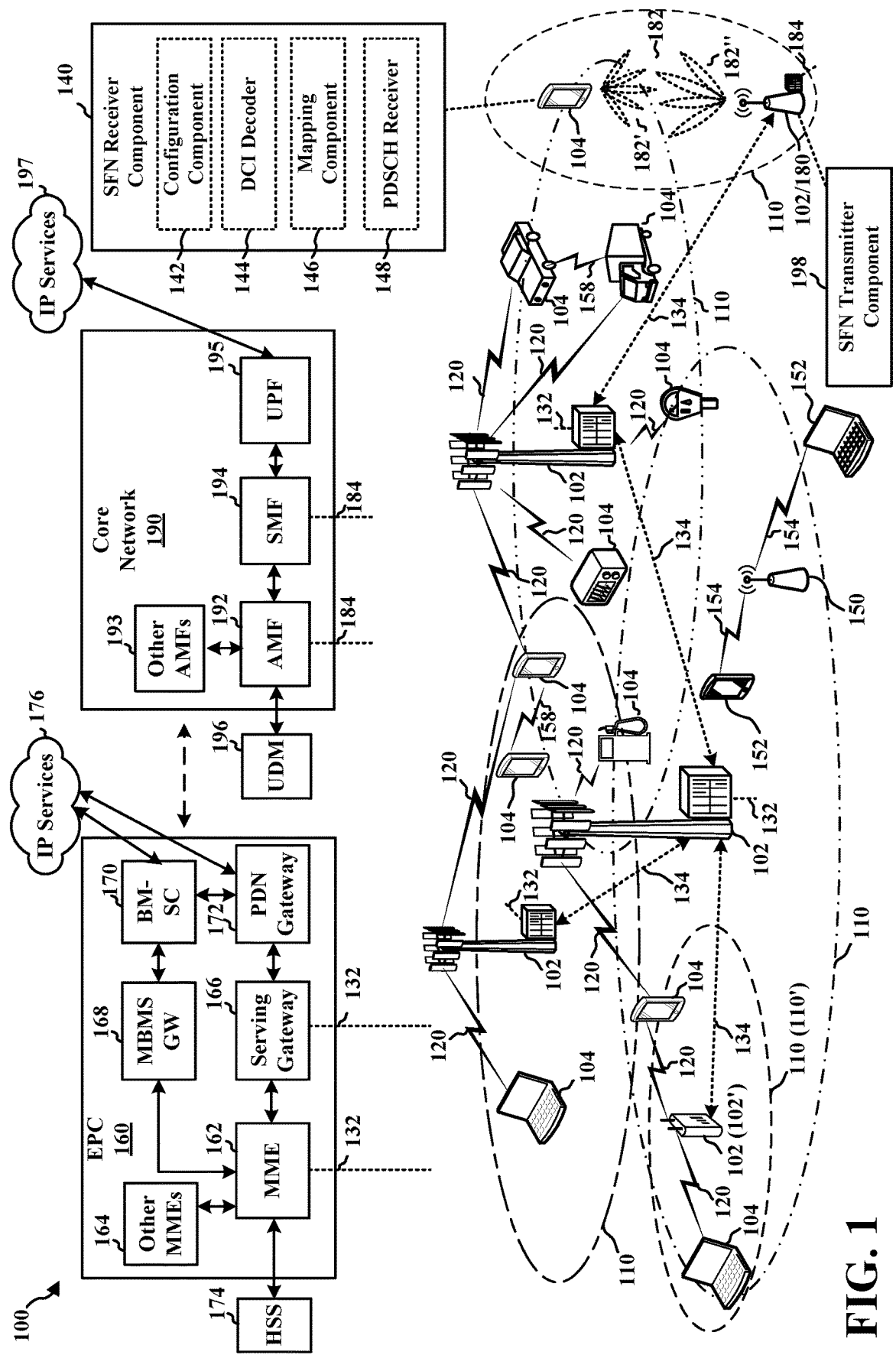
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A single frequency network (SFN) transmission may refer to a transmission from two or more transmit-receive points (TRPs) where each TRP transmits the same signal on the same resources such that to a user equipment (UE) receiving the transmission, the combined transmission appears to be from a single TRP. For example, in a SFN transmission of a physical downlink shared channel, two or more reference signals apply to two or more demodulation reference signal (DMRS) ports across all resource blocks and symbols for the PDSCH for at least one transmission layer of the PDSCH. In some examples of SFN transmissions, a transmission configuration indicator (TCI) state applies to all DMRS ports or all transmission layers across all resource blocks and symbols for the downlink transmission. In an aspect, transmitting data as an SFN transmission may improve reliability of the transmission in comparison to a transmission from a single TRP.

A transparent SFN transmission may utilize a single TCI state in which the two or more TRPs transmit a reference signal as a SFN transmission. The reference signals from the two or more TRPs may be combined over the air. The UE may receive the combined reference signal and determine a quasi-co-location (QCL) for receiving a downlink transmission. In contrast, in a non-transparent SFN transmission, two or more TCI states may be indicated to the UE. Each TRP may transmit a different reference signal according to one of the TCI states. The UE may receive the different reference signals and determine a composite QCL based on the different reference signals.

Signaling of a non-transparent SFN transmission may be more complex than indication of a transparent SFN transmission. For a transparent SFN transmission, the base station may transmit a downlink control information (DCI) indicating the TCI states for transparent SFN transmission, and the UE may receive the SFN transmission in the same manner as a transmission from a single TRP (i.e., the SFN nature of the transmission is transparent to the UE). In contrast, for the non-transparent SFN, the UE determines a composite QCL based on two or more reference signals. Accordingly, the UE may perform an additional operation for non-transparent SFN transmissions when a DCI indicates two or more reference signals for an SFN transmission. Additionally, indication of two TCI states in a DCI, may also be used to indicate multiplexed transmissions. For example, time division multiplexed (TDM) transmissions may use different TCI states for different symbols, frequency division multiplexed (FDM) transmissions may use different TCI states for different resource blocks, or space division multiplexed (SDM) transmissions may use different TCI states for different layers. Accordingly, alternative techniques for signaling SFN transmissions may be beneficial.

In an aspect of the present disclosure, under some SFN schemes, a transmission occasion may include one layer of the same transport block with multiple DMRS ports associated with multiple TCI state indices. That is, there may be a mapping between DMRS ports to transmission layers that maps two or more DMRS ports to a transmission layer of the PDSCH. Further, one or more layers may be transmitted as an SFN transmission, while other layers may not (e.g., the transmission layer is mapped to a single DMRS port).

In an aspect of the present disclosure, the UE may receive a DCI including an antenna port field and a TCI field for scheduling a PDSCH. The TCI field may indicate that two or more reference signals apply to two or more demodulation reference signal (DMRS) ports across all resource blocks and symbols for the PDSCH for at least one transmission layer of the PDSCH. That is, the at least one transmission layer of the PDSCH may be an SFN transmission. The antenna port field may indicate a plurality of DMRS ports. The UE may be configured with a mapping rule that maps the indicated DMRS ports to transmission layers of the PDSCH. Specifically, for an SFN transmission, the mapping may map two or more DMRS ports to the at least one layer of the PDSCH that is the SFN transmission. The UE may receive the at least one layer of the PDSCH as a SFN transmission based on the two or more reference signals and the two or more DMRS ports. For example, the UE may receive the at least one layer of the PDSCH based on a composite QCL for the two or more DMRS ports.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include a SFN receiver component 140 that receives a PDSCH transmission where at least one transmission layer of the PDSCH is an SFN transmission with two or more DMRS ports mapped to the at least one transmission layer. The SFN receiver component 140 may include a configuration component 142 that receives a configuration message such as a radio resource control (RRC) message that indicates a mapping rule. The SFN receiver component 140 may include a DCI decoder 144 that decodes a DCI including a TCI field and an antenna port field. The DCI decoder 144 may determine, based on the TCI field, that two or more reference signals apply to two or more DMRS ports across all resource blocks and symbols for the PDSCH for at least one transmission layer of the PDSCH. The DCI decoder 144 may determine a plurality of indicated DMRS ports based on the antenna port field. The SFN receiver component 140 may include a mapping component 146 that maps, based on the mapping rule, the indicated DMRS ports to transmission layers of the PDSCH. The mapping component 146 maps two or more DMRS ports to the at least one transmission layer of the PDSCH. The SFN receiver component 140 may include a PDSCH receiver 148 that receives the at least one transmission layer of the PDSCH as a SFN transmission based on the two or more reference signals and the two or more DMRS ports.

Figure 7:
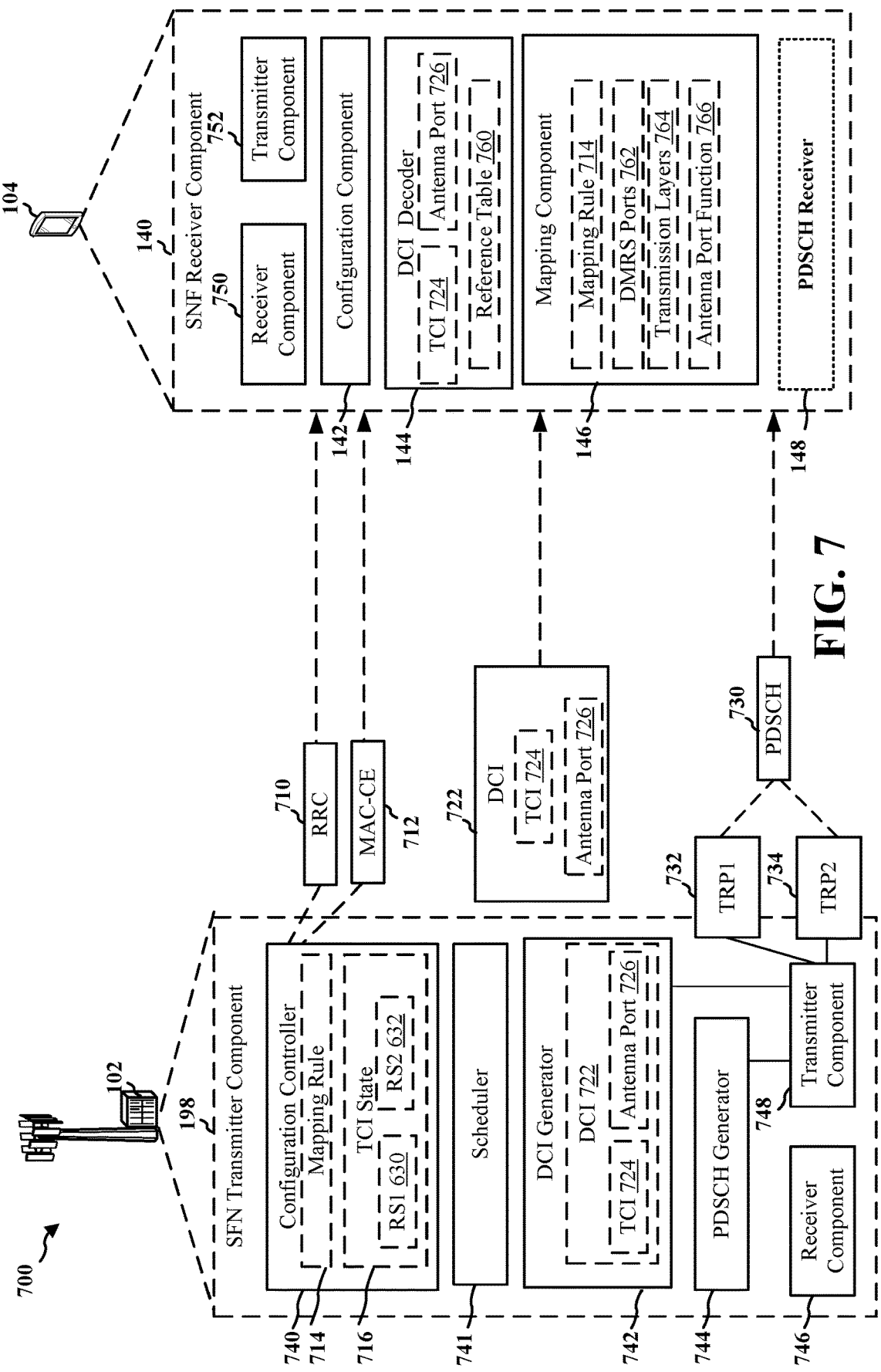
FIG. 7 is a diagram illustrating example communications and components of a base station and a UE.
Figure 8:
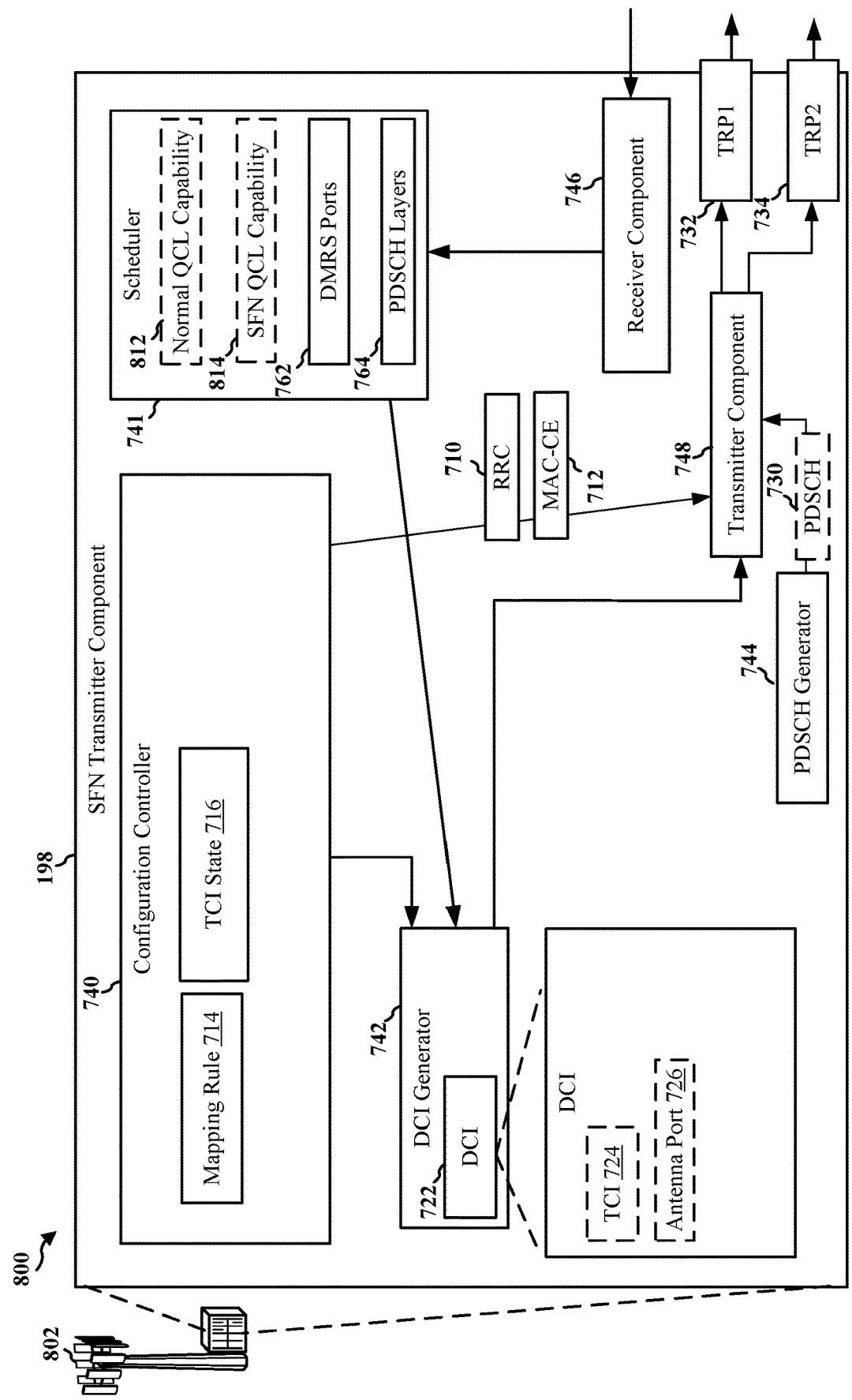
FIG. 8 is a conceptual data flow diagram illustrating the data flow between different means/components in an example base station.

In an aspect, one or more of the base stations 102 may include a SFN transmitter component 198 that transmits at least one transmission layer of a PDSCH, from two or more TRPs, as an SFN transmission. As illustrated in FIGS. 7 and 8, the SFN transmitter component 198 may include, for example, a configuration controller 740 that configures a mapping rule and/or configures a TCI state to indicate two or more reference signals. The SFN transmitter component 198 may include a DCI generator 742 that generates a DCI for transmission including the antenna port field and the TCI field for scheduling the PDSCH. The SFN transmitter component 198 may include a PDSCH generator 744 that transmits the at least one layer of the PDSCH from two or more transmit-receive-points based on the two or more reference signals and the two or more DMRS ports.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
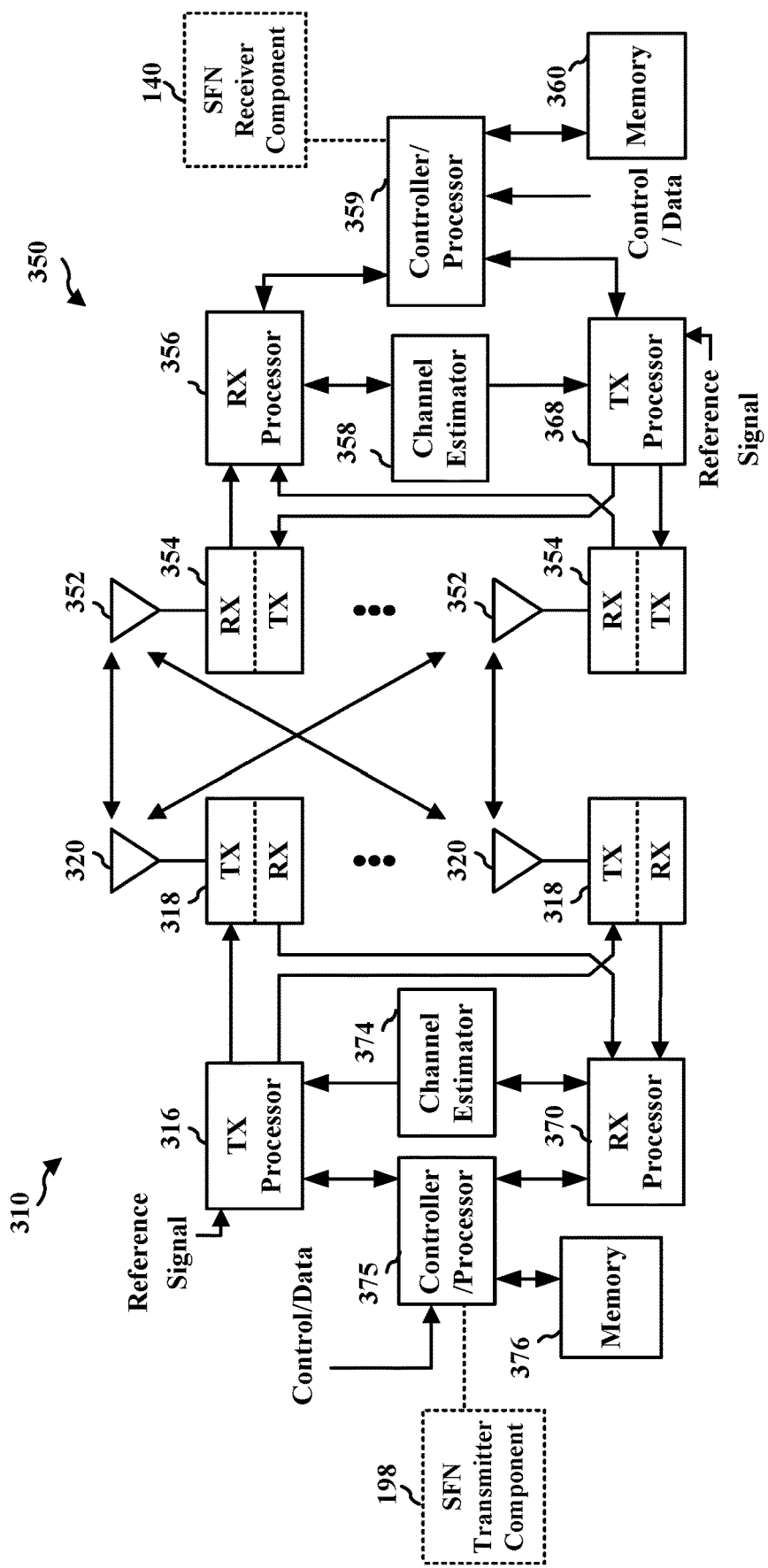
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the SFN receiver component 140 of FIG. 1.

At least one of the TX processor 316, the RX processor 370, and the controller/processor 375 may be configured to perform aspects in connection with the SFN transmitter component 198 of FIG. 1.

Figure 4:
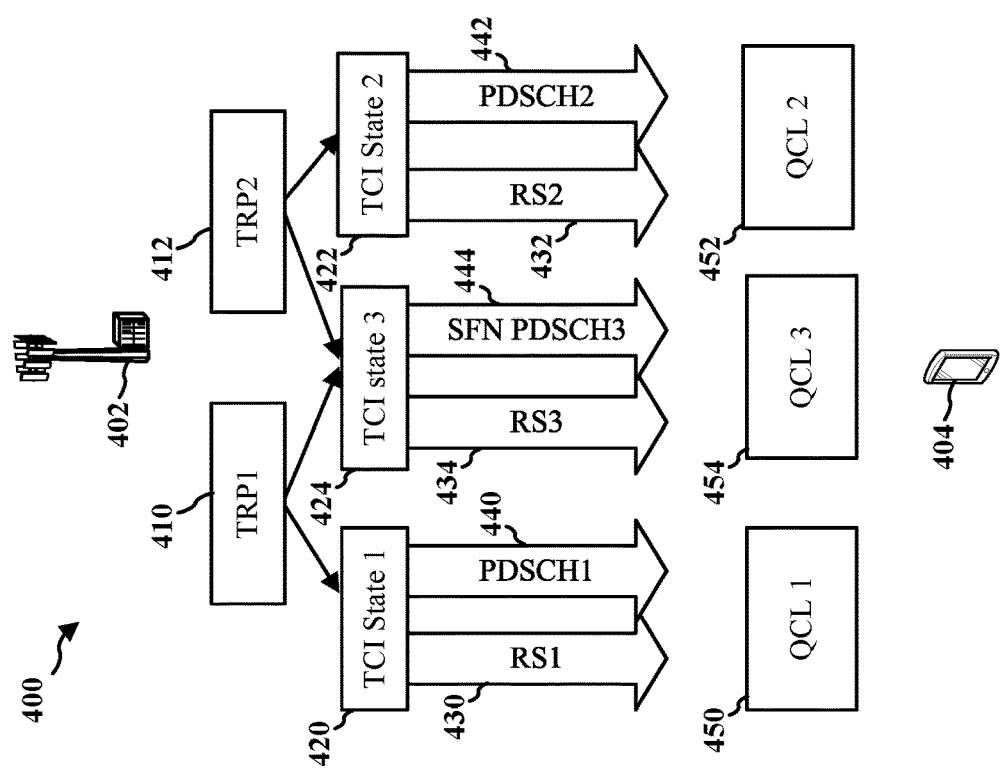
FIG. 4 is a diagram of an example transmission scheme for transparent single frequency network transmissions.

FIG. 4 is a diagram 400 illustrating an example of transparent SFN transmission. A base station 402 may include two or more TRPs (e.g., a first TRP 410 and a second TRP 412). The base station 402 may define various TCI states, which may be configured for the UE 404 via RRC signaling and activated via a media access control (MAC) control element (CE) and/or DCI signaling. For example, the base station 402 may configure a first TCI state 420 that transmits only from the first TRP 410 and a second TCI state 422 that transmits only from the second TRP 412. In each of the TCI states 420 and 422, the respective TRP may transmit a different reference signal 430, 432. The UE 404 may determine a respective QCL 450, 452 based on the reference signal and use the respective QCL 450, 452 for receiving the respective PDSCH 440, 442. For SFN transmissions, the base station 402 may configure a third TCI state 424 in which the base station 402 transmits from both of the first TRP 410 and the second TRP 412. In the third TCI state 424, both the first TRP 410 and the second TRP 412 may transmit a third reference signal 434 as an SFN transmission. The UE 404 may receive the third reference signal 434, determine a third QCL 454, and receive the SFN PDSCH 444 based on the third QCL 454. Accordingly, the SFN transmission is transparent to the UE 404 because the UE 404 determines the QCL 454 from the reference signal 434 in the same manner for the SFN transmission as for the single TRP transmission.

Figure 5:
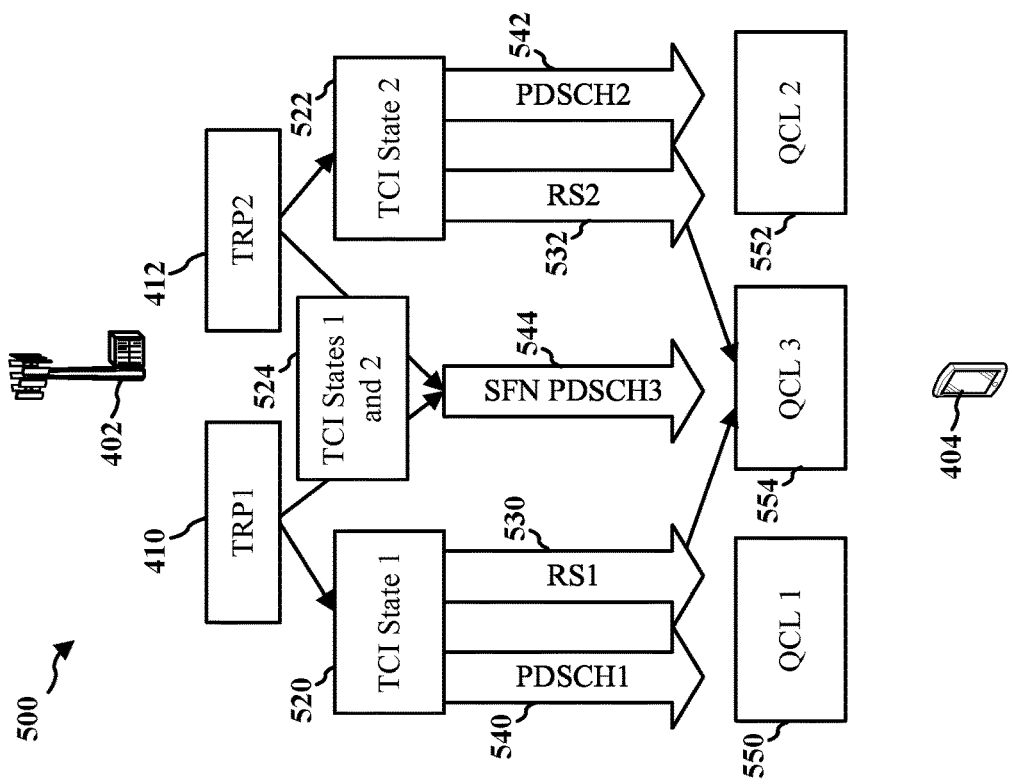
FIG. 5 is a diagram of a first example transmission scheme for non-transparent single frequency network transmissions.

FIG. 5 is a diagram 500 illustrating an example of a first non-transparent SFN transmission scheme. The base station 402 may be similar to the base station 402 of FIG. 4 and may include two or more TRPs (e.g., a first TRP 410 and a second TRP 412). The base station 402 may define various TCI states, which may be configured for the UE 404 via RRC signaling and activated via MAC-CE and/or DCI signaling. For example, the base station 402 may configure a first TCI state 520 that transmits only from the first TRP 410 and a second TCI state 522 that transmits only from the second TRP 412. In each of the TCI states 520 and 522, the respective TRP may transmit a different reference signal 530, 532. The UE 404 may determine a respective QCL 550, 552 based on the respective reference signal 530, 532 and use the respective QCL 550, 552 for receiving the respective PDSCH 540, 542. For non-transparent SFN transmissions, the base station 402 may configure the UE 404 to receive a transmission based on two or more TCI states. As illustrated, a SFN PDSCH 544 may be based on a combination 524 of the first TCI state 520 and the second TCI state 522. The UE 404 may receive the first reference signal 530 and the second reference signal 532. The UE 404 may determine a composite QCL 554 based on the first reference signal 530 and the second reference signal 532. The UE 404 may receive the SFN PDSCH 544 based on the composite QCL 554. In an aspect, the non-transparent SFN transmission may use fewer reference signals than transparent SFN transmission but the UE 404 may perform an additional operation of determining the composite QCL 554.

Figure 6:
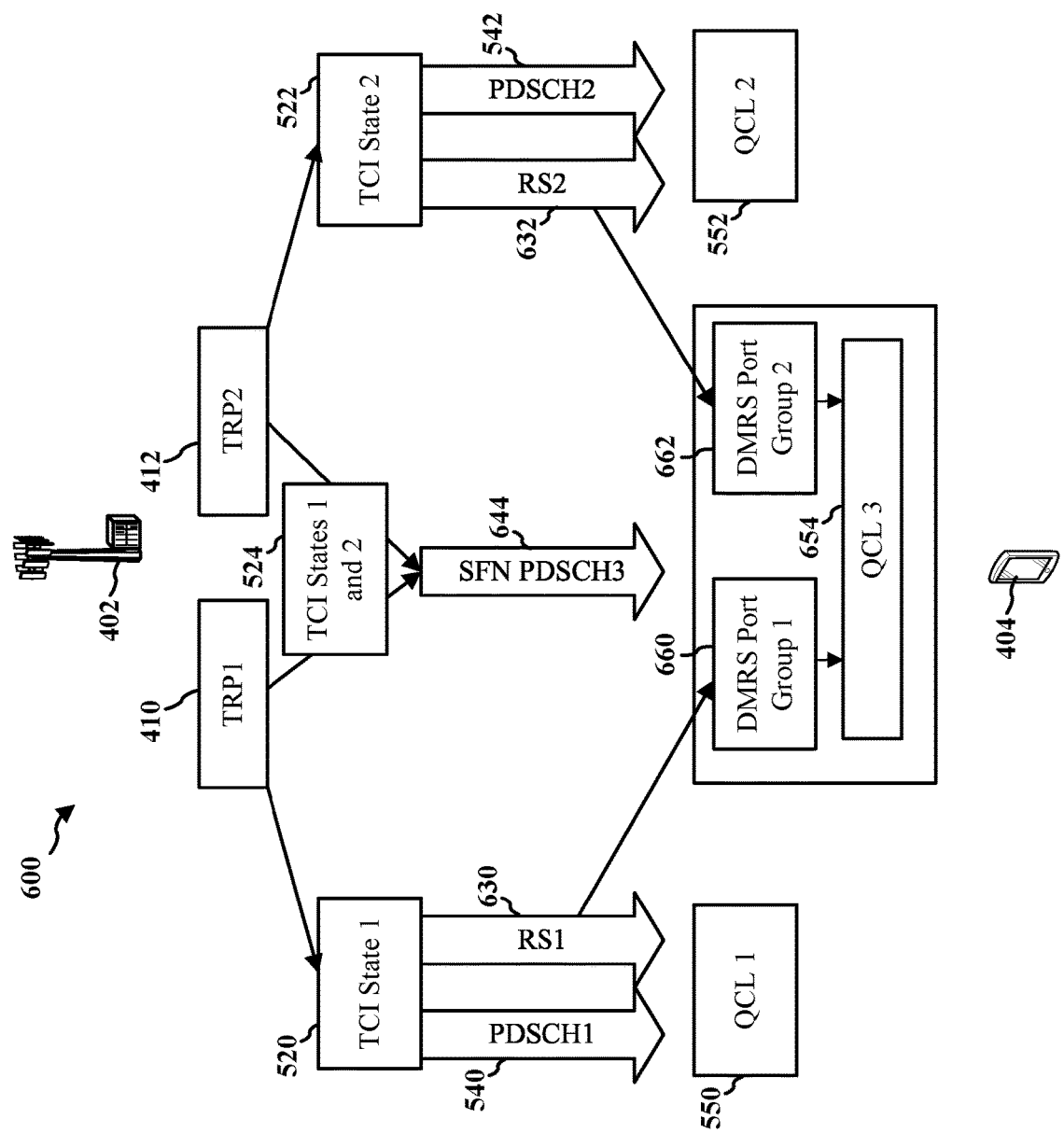
FIG. 6 is a diagram of a second example transmission scheme for non-transparent single frequency network transmissions.

FIG. 6 is a diagram 600 illustrating an example of a second non-transparent SFN transmission scheme. The base station 402 may be similar to the base station 402 of FIG. 4 and may include two or more TRPs (e.g., a first TRP 410 and a second TRP 412). The base station 402 may define various TCI states, which may be configured for the UE 404 via RRC signaling and activated via MAC-CE and/or DCI signaling. For example, the base station 402 may configure a first TCI state 520 that transmits only from the first TRP 410 and a second TCI state 522 that transmits only from the second TRP 412. In each of the TCI states 520 and 522, the respective TRP may transmit a different reference signal 630, 632. The UE 404 may determine a respective QCL 550, 552 based on the respective reference signal and use the respective QCL 550, 552 for receiving the respective PDSCH 540, 542. For the second non-transparent SFN transmission scheme, the base station 402 may configure the UE 404 to receive a PDSCH 644 where two or more reference signals (e.g. RS1 630 and RS2 632) apply to two or more DMRS ports (e.g., one DMRS port from each of DMRS port groups 660 and 662) across all resource blocks and symbols for the PDSCH 644 for at least one transmission layer of the PDSCH 644. As illustrated, a SFN PDSCH 644 may be based on a combination 524 of the reference signals 530, 532 for the first TCI state 520 and the second TCI state 522. The UE 404 may receive the first reference signal 530 and the second reference signal 532. The UE 404 may determine a composite QCL 654 based on the first reference signal 530, the second reference signal 532, the first DMRS port group 660, and the second DMRS port group 662. The UE 404 may receive the SFN PDSCH 644 based on the composite QCL 654. In an aspect, the second non-transparent SFN transmission scheme may provide diversity among layers of the PDSCH transmission.

In the transparent SFN scheme in FIG. 4 and the first non-transparent SFN scheme of FIG. 5, there is a one-to-one mapping between PDSCH DMRS ports and PDSCH data layers. The DMRS ports for the transmission may be indicated by an antenna ports field in a downlink DCI. For example, the following table may map a value signaled in the antenna ports field to specific DMRS ports for a DMRS type 2 and max length of 1. Other tables may be defined for combinations of DMRS type (1 or 2) and max length (1 or 2). The DMRS ports may be grouped into CDM groups based on the DRMS type and max length. For example, for the table below, the first DMRS CDM group includes ports 0,1; the second DMRS CDM group includes ports 2,3; the third DMRS CDM group includes ports 4,5.

TABLE 7.3.1.2.2-3

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

Antenna ports for the data layer corresponding to the indicated DMRS ports may be determined by adding 1000 to the DMRS port number. For a transparent SFN scheme and the first non-transparent SFN scheme, the number of data layers may be equal to the number of antenna ports and also equal to the number of DMRS ports. If the number of layers and the number of DMRS ports is greater than 4, data layers may be mapped to two codewords (for transmission of 2 TBs in one PDSCH). If there are n layers, the first $\lfloor n/2 \rfloor$ layers are mapped to the first codeword, and the remaining $\lceil n/2 \rceil$ layers are mapped to the second codeword.

For the example of the second non-transparent SFN scheme illustrated in FIG. 6, the number of DMRS ports is twice the number of layers (i.e., each PDSCH data layer is associated with 2 DMRS ports). In general, one PDSCH layer may be associated with more than 2 layers (in case of SFN transmission corresponds to more than 2 TRPs). Also, one PDSCH layer of a transmission may be associated with multiple DMRS ports and another layer of the transmission may be associated with a single DMRS port. As a result, some of the procedures related to DMRS port indication, antenna ports, and codeword-layer mapping may be different for the second non-transparent SFN scheme of FIG. 6.

In an aspect, the present disclosure provides different mapping rules that may be used to map PDSCH layers to DMRS ports. In particular, for SFN transmissions, the mapping rules map a PDSCH layer to two or more DMRS ports. According to a first mapping rule, the DMRS ports that belong to different CDM groups may be used for an SFN transmission. DMRS ports within each DMRS CDM group are ordered with respect to the DMRS port number. The $i^{th}$ DMRS ports within the first CDM group may be used with the $i^{th}$ DMRS port within the second CDM group for an SFN transmission of an $i^{th}$ transmission layer. That is, the first mapping rule may specify mapping the indicated DMRS ports with a same ordinal number within a respective CDM group to a transmission layer with a corresponding ordinal number. For example, referring to the table above, if a value of 10 is received for the antenna ports field indicating DMRS ports 0-3 and 2 CDM group, the DMRS ports 0-3 may be mapped as ports 0 and 1 in the first CDM group, and ports 2 and 3 in the second CDM group. According to the first mapping rule, the first data layer corresponds to a first DMRS port pair {0,2} and a second data layer corresponds to a second DMRS port pair {1,3}. The DMRS port pairs may be used to transmit the PDSCH data layer as an SFN transmission. In an aspect, the first mapping rule may apply to more than 2 DMRS ports being used for an SFN transmission (e.g., from 3 or more TRPs). In this case 3 CDM groups may be used, which is possible for DMRS type 2. For example, referring to the table above, if 2 codewords are used (e.g., 2 transport blocks are scheduled by the DCI) and the value of 1 is received for the antenna ports field, the indicated DMRS ports may be 0-5 and there may be 3 CDM groups. DMRS ports 0 and 1 may be in first CDM group, DMRS ports 2 and 3 may be in the second CDM group, and DMRS ports 4 and 5 may be in the third CDM group. The first data layer corresponds to a first DMRS port triple {0,2,4} and the second data layer corresponds to a second DMRS port triple {1,3,5}. The DRMS port triples may be used to transmit the PDSCH data layer as an SFN transmission from 3 TRPs.

A second mapping rule may map DMRS ports that belong to the same CDM group to a transmission layer for a SFN transmission. The number of data layers may be equal to a number of DMRS CDM groups that the indicated DMRS ports belong to. For example, referring to the table above, if a value of 10 is received for the antenna ports field indicating DMRS ports 0-3 and 2 CDM group, the DMRS ports 0-3 may be mapped as ports 0 and 1 in the first CDM group, and ports 2 and 3 in the second CDM group. According to the second mapping rule, the first data layer corresponds to a first DMRS port pair {0,1} and a second data layer corresponds to a second DMRS port pair {2,3}. The DMRS port pairs may be used to transmit the PDSCH data layer as an SFN transmission. As another example, if the antenna port field indicates DMRS ports 0, 1, 6, and 7, all of the indicated DMRS ports {0,1,6,7} belong to the first CDM group (for Type 2). For such a transmission for DMRS type 2 and the max length of 2, a different table may define the DMRS ports. Accordingly, one data layer may correspond to the DMRS ports quadruple {0,1,6,7} for an SFN transmission from 4 TRPs. As another example, referring to the table above, if 2 codewords are used and the value of 1 is received for the antenna ports field, the indicated DMRS ports may be 0-5 and there may be 3 CDM groups. DMRS ports 0 and 1 may be in first CDM group, DMRS ports 2 and 3 may be in the second CDM group, and DMRS ports 4 and 5 may be in the third CDM group. The first data layer corresponds to first DMRS port pair {0,1}; a second data layer corresponds to a second DMRS port pair {2,3}, and a third data later corresponds to a third DMRS port pair {4,5}. The DMRS port pairs may be used to transmit each of the first, second, and third PDSCH data layers as an SFN transmission.

In an aspect, PDSCH antenna port numbering may be a function of the mapping between a data layer and two or more DMRS ports for an SFN transmission. In an implementation, SFN DMRS ports are associated with a port number corresponding to the lowest DMRS port number among the DMRS ports for an SFN transmission of one data layer. Then the antenna port is equal to 1000+the associated port number for each data layer. For example, a first data layer may correspond to first DMRS port pair {0,1} for SFN transmission and a second data layer may correspond to second DMRS port pair {2,3} for a SFN transmission. The antenna port numbers may be equal to 1000+0 for first data layer and 1000+2 for the second data layer. A number of PDSCH antenna ports (which is equal to number of data layers) may be used to determine a number of codewords instead of using a number of DMRS ports.

In another aspect, some data layers may correspond to two or more DMRS ports for SFN transmission while other data layers of the same PDSCH can correspond to one DMRS port. For example, referring to the table above, if the antenna ports field indicates a value of 9, the indicated DMRS ports may be ports 0-2 and 2 CDM groups may be indicated. The first data layer may correspond to a first DMRS port pair {0,2} for SFN transmission (e.g., at least one PDSCH transmission layer) and a second data layer may correspond to DMRS port 2 (e.g., a non-SF data layer).

FIG. 7 is a diagram 700 illustrating example communications and components of a base station 102 and a UE 104. The UE 104 may include the SFN receiver component 140. The base station 102 may include the SFN transmitter component 198.

The SFN transmitter component 198 may include a configuration controller 740 that transmits a configuration that provides for SFN transmissions. In an aspect, the configuration controller 740 may configure a mapping rule 714 that may be used to map PDSCH layers to DMRS ports. The configuration controller 740 may transmit the mapping rule 714 in an RRC message 710. Alternatively, the mapping rule 714 may be indicated in a DCI 722 that schedules a PDSCH 730. The configuration controller 740 may also configure one or more TCI states 716 for indicating an SFN transmission. Since an SFN transmission may apply two or more reference signals (e.g., RS1 630 and RS2 632) to DMRS ports or transmission layers across all resource blocks and symbols for the PDSCH, the TCI state or TCI states 716 for an SFN transmission may indicate the two or more reference signals, 630, 632. One technique is to indicate two TCI states for the SFN transmission. In an aspect of the present disclosure, one TCI state may be configured with two or more reference signals 630, 632. For example, the configuration controller 740 may transmit the RRC message 710 to configure at least one TCI state 716 to indicate two or more reference signals for an SFN transmission. Further details of TCI state configuration are discussed below with respect to FIGS. 10 and 11. The configuration controller 740 may transmit a MAC-CE 712 to activate the one or more TCI states indicating the two or more reference signals for an SFN transmission.

The SFN transmitter component 198 may include a scheduler 741 configured to determine to transmit at least one layer of a PDSCH 730 as a SFN transmission that applies two or more reference signals 630, 632 to two or more DMRS ports across all resource blocks and symbols for the PDSCH 730 for the at least one transmission layer of the PDSCH 730. The scheduler 741 may map, based on the mapping rule 714, two or more DMRS ports to the at least one layer of the PDSCH 730.

The SFN transmitter component 198 may include a DCI generator 742 configured to generate a DCI 722 that includes a TCI field 724 that indicates the at least two reference signals and an antenna port field 726 that indicates a plurality of DMRS ports including two or more DMRS ports mapped to a PDSCH transmission layer. The DCI generator 742 may transmit the DCI 722 to schedule the transmission of PDSCH 730.

The base station 102 and the SFN transmitter component 198 may include a PDSCH generator 744 that generates a PDSCH 730 for transmission. The PDSCH generator 744 may generate transport blocks of coded data that are used to generate OFDM symbols for transmission. The PDSCH generator 744 may provide the OFDM symbols to the transmitter component 748 for transmission via TRPs 732 and 734.

The base station 102 may include a receiver component 746, which may include, for example, a radio frequency (RF) receiver for receiving the signals described herein. The base station 102 may include the transmitter component 748, which may include, for example, an RF transmitter for transmitting the signals described herein. In an aspect, the receiver component 746 and the transmitter component 748 may be implemented as a transceiver.

As discussed above regarding FIG. 1, the UE 104 may include the configuration component 142, the DCI decoder 144, the mapping component 146, and the PDSCH receiver 148. The UE 104 may also include a receiver component 750 and a transmitter component 752. The receiver component 750 may include, for example, a RF receiver for receiving the signals described herein. The transmitter component 752 may include for example, an RF transmitter for transmitting the signals described herein. In an aspect, the receiver component 750 and the transmitter component 752 may be implemented as a transceiver.

The configuration component 142 may receive the RRC message 710 and/or the MAC-CE 712. The configuration component 142 may, for example, extract the mapping rule 714 from the RRC message 710. The configuration component 142 may extract a configuration for the TCI state 716. The configuration component 142 may extract TCI codepoints from the MAC-CE 712 activating the TCI state 716. The configuration component 142 may provide the mapping rule 714 to the mapping component 146. The configuration component 142 may provide the TCI state 716 and or the corresponding codepoint to the DCI decoder 144.

The DCI decoder 144 may receive the DCI 722 including the TCI field 724 and the antenna port field 726. The TCI field 724 may correspond to a TCI codepoint activated by the MAC-CE 712. The TCI codepoint may correspond to one or more TCI states (e.g., TCI state 716) that indicate two or more reference signals 630, 632. The antenna port field 726 may specify a value in a reference table 760 indicating combinations of CDM groups and DMRS ports. The DCI decoder 144 may determine the number of CDM groups and the indicated DMRS ports based on the value.

The mapping component 146 may map, based on the mapping rule 714, the indicated DMRS ports to transmission layers of the PDSCH 730. The mapping rule 714 may be either the first mapping rule or the second mapping rule discussed above. The mapping rule for a particular transmission may be indicated by the RRC message 710, the MAC-CE 712, or the DCI 722. In either mapping rule, for an SFN transmission, the mapping rule 714 maps two or more DMRS ports 762 to the at least one transmission layer 764 of the PDSCH 730. The mapping component 146 may determine the particular mapping based on indicated DMRS ports, CDM groups, and number of layers as described above regarding the first mapping rule and the second mapping rule. The mapping component 146 may also determine antenna ports corresponding to the DMRS ports based on an antenna port function 766.

The PDSCH receiver 148 may receive the PDSCH 730 based on the composite QCL 654. The PDSCH receiver 148 may generate a composite QCL (e.g., composite QCL 654) based on the two or more reference signals 630, 632 and the two or more DMRS ports 762. For example, the PDSCH receiver 148 may derive the composite QCL from the two or more reference signals (e.g., reference signal 630 and reference signal 632) based on a channel estimation for the corresponding DMRS port. Each of the two or more reference signals corresponds to one of the two or more DMRS ports. For example, the PDSCH receiver 148 may apply antenna weights of the composite QCL 654 to signals received at the UE 104. The PDSCH receiver 148 may further demodulate, de-interleave, and decode the received signals to determine the data transmitted on the PDSCH 730.

FIG. 8 is a conceptual data flow diagram 800 illustrating the data flow between different means/components in an example base station 802, which may be an example of the base station 102 including the SFN transmitter component 198.

The configuration controller 740 may determine operation parameters for a UE 104 for receiving a SFN transmission of a PDSCH. For example, the configuration controller 740 may include the mapping rule 714 that determines how the UE 104 is to map DMRS ports to transmission layers. The configuration controller 740 may generate the RRC message 710 including the mapping rule 714 and/or a configuration for the TCI state 716 including the two or more reference signals 630, 632. The configuration controller 740 may transmit the RRC message 710 to the UE 104 via the transmitter component 748. The configuration controller 740 may also determine active TCI states, which the configuration controller 740 may include the MAC-CE 712. The configuration controller 740 may transmit the MAC-CE 712 to the UE 104 via the transmitter component 748.

The DCI generator 742 may receive an indication of a PDSCH from the scheduler 741. In an aspect, the scheduler 741 may schedule PDSCH transmissions based on a normal QCL capability 812 or a SFN QCL capability 814. The normal QCL capability may indicate a duration of time for the UE 104 to generate a QCL when a DCI indicates a TCI state. The SFN QCL capability 814 may similarly indicate a duration of time for the UE 104 to generate a composite QCL when a DCI indicates two or more TCI states for an SFN transmission. The scheduler 741 may schedule the DCI 722 and PDSCH 730 such that a time difference between the DCI and the PDSCH is at least the duration of the applicable normal QCL capability 812 or a SFN QCL capability 814. The DCI generator 742 may generate a DCI 722 based on the configuration information received from the configuration controller 740 and the schedule information received from the scheduler 741. As discussed above, the DCI 722 may indicate at least two reference signals 630, 632 for example, by indicating the codepoint of the TCI state 716 in the TCI field 724. The DCI 722 may include the antenna port field 726 indicating the DMRS ports and CDM groups.

The PDSCH generator 744 may generate a PDSCH 730 based on downlink data scheduled for the UE 104. The PDSCH generator 744 may generate OFDM symbols for transmission.

The transmitter component 748 may transmit the PDSCH 730 via at least two TRPs 732, 734. The TRPs 732, 734 may transmit the PDSCH 730 based on a respective reference signal and DMRS port on a corresponding transmission layer across all resource blocks and symbols for the PDSCH 730.

Figure 9:
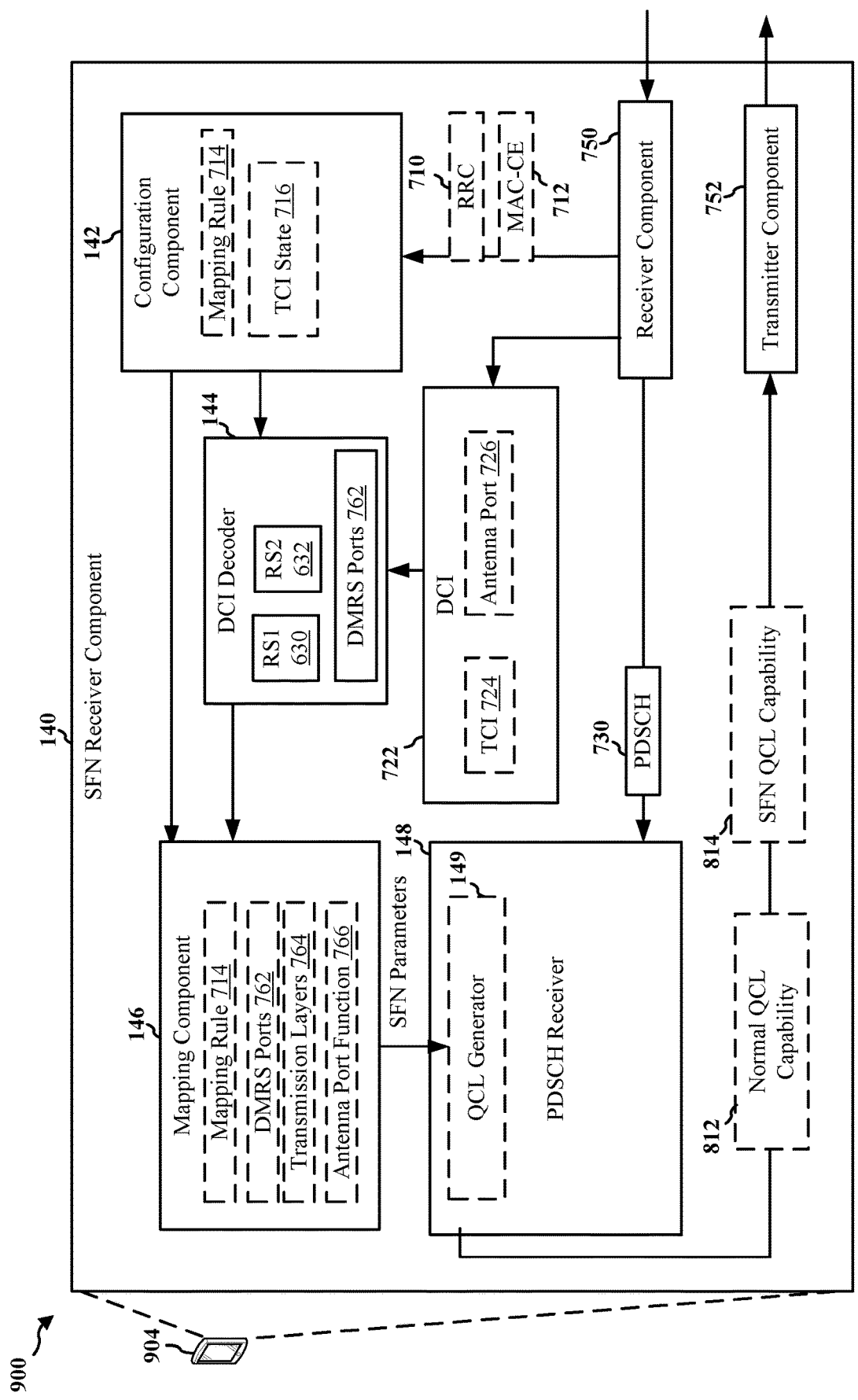
FIG. 9 is a conceptual data flow diagram illustrating the data flow between different means/components in an example UE.

FIG. 9 is a conceptual data flow diagram 900 illustrating the data flow between different means/components in an example UE 904, which may be an example of the UE 104 and include the SFN receiver component 140.

The receiver component 750 may receive downlink signals including RRC message 710, MAC-CE 712, DCI 722, and PDSCH 730. The receiver component 750 may pass configuration messages, such as the RRC message 710 or MAC-CE 712, to the configuration component 142. The receiver component 750 may pass the DCI 722 to the DCI decoder 144. The receiver component 750 may pass the PDSCH 730 to the PDSCH receiver 148.

The configuration component 142 may determine the mapping rule 714 and the configuration of the TCI state 716. The configuration component 142 may configure the mapping component 146 with the mapping rule 714. The configuration component 142 may configure the DCI decoder 144 with the TCI state 716.

The DCI decoder 144 may decode PDCCH candidates based on a configured CORESET and search space set to determine the content of DCI 722. The DCI decoder 144 determine that a TCI field 724 of the DCI 722 indicates at least two references signals 630, 632. The DCI decoder 144 may determine that the antenna port field 726 indicates two or more DMRS ports 762. The DCI decoder 144 may provide the reference signals 630, 632 and DMRS ports 762 to the mapping component 146.

The mapping component 146 may apply either the first mapping rule or the second mapping rule based on the configured mapping rule 714 to the reference signals 630, 632 and DMRS ports 762. The mapping component 146 may map two or more of the DMRS ports 762 to at least one transmission layer 764. The mapping component 146 may determine an antenna port for each transmission layer 764 based on the antenna port function 766 and the DMRS ports mapped to the respective transmission layer 764.

In an aspect, the PDSCH receiver 148 may include a QCL generator 149 that generates the composite QCL (e.g., composite QCL 654) as discussed above based on the at least two DMRS ports 762 and corresponding reference signals 630, 632. In an aspect, the QCL generator 149 may report one or both of the normal QCL capability 812 or the SFN QCL capability 814 indicating a duration of time to generate a QCL based on one or more reference signals. The QCL generator 149 may provide the composite QCL 654 to the PDSCH receiver 148 for receiving the PDSCH 730 scheduled by the DCI 722. The PDSCH receiver 148 may receive the PDSCH 730 based on the composite QCL.

FIG. 10 is a diagram illustrating example configurations for QCL information 1000 and 1010 that allow designation of two or more reference signals. In the QCL information 1000, a reference signal information element may be defined to indicate a number of reference signals. The QCL type information element may be indicated as an SFN QCL type that corresponds to two or more reference signals. The SFN QCL type may be in addition to existing QCL types (e.g., QCL Type A/B/C/D). In the second example, the QCL information 1010 may include a second reference signal information element. For QCL information 1010, the QCL type information element may also be indicated as an SFN QCL type that corresponds to two or more reference signals. Accordingly, one TCI state may be configured with the SFN QCL type based on one of the example configurations of QCL information. When the DCI 722 indicates a TCI state that is configured with the SFN QCL type, the transmission scheduled by the DCI 722 is an SFN transmission and the composite QCL 654 is based on the two or more indicated reference signals.

Figure 11:
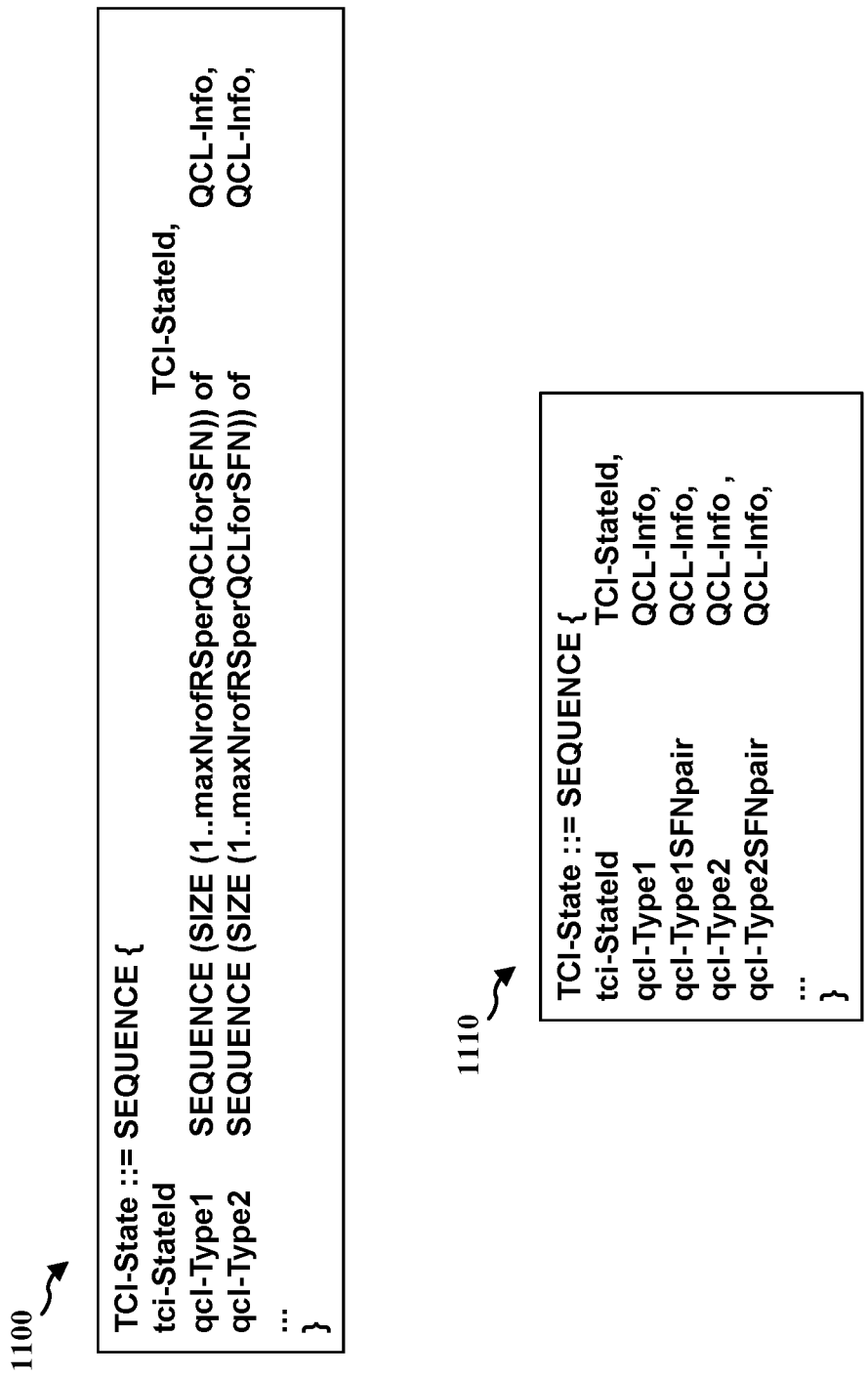
FIG. 11 is a diagram of an example configuration of a transmission configuration indicator (TCI) state for indicating two or more reference signals.

FIG. 11 is a diagram illustrating example configurations for a TCI states 1100 and 1110 that allow designation of two or more QCL information. In the TCI state 1100, the TCI state information element may include two or more QCL types (e.g., qcl-Type1 and qcl-Type2) information elements that are configured with the same QCL type. Each of the QCL information may be configured with a QCL information indicating the same QCL type. Each QCL information may indicate a single reference signal. Accordingly, the TCI state 1100 may indicate two or more reference signals for the same QCL type. In the second example, the TCI state 1110 may include a paired SFN QCL type information element for one or more of the QCL type information elements. Each of the QCL type information element and the paired SFN QCL type information element may be configured with a QCL information indicating the same QCL type. Accordingly, a UE receiving a DCI 722 indicating the TCI state configured with two QCL types information elements having the same QCL type may determine that the TCI state indicates an SFN transmission. The composite QCL 654 for the SFN transmission is based on the two or more reference signals of the QCL information.

Figure 12:
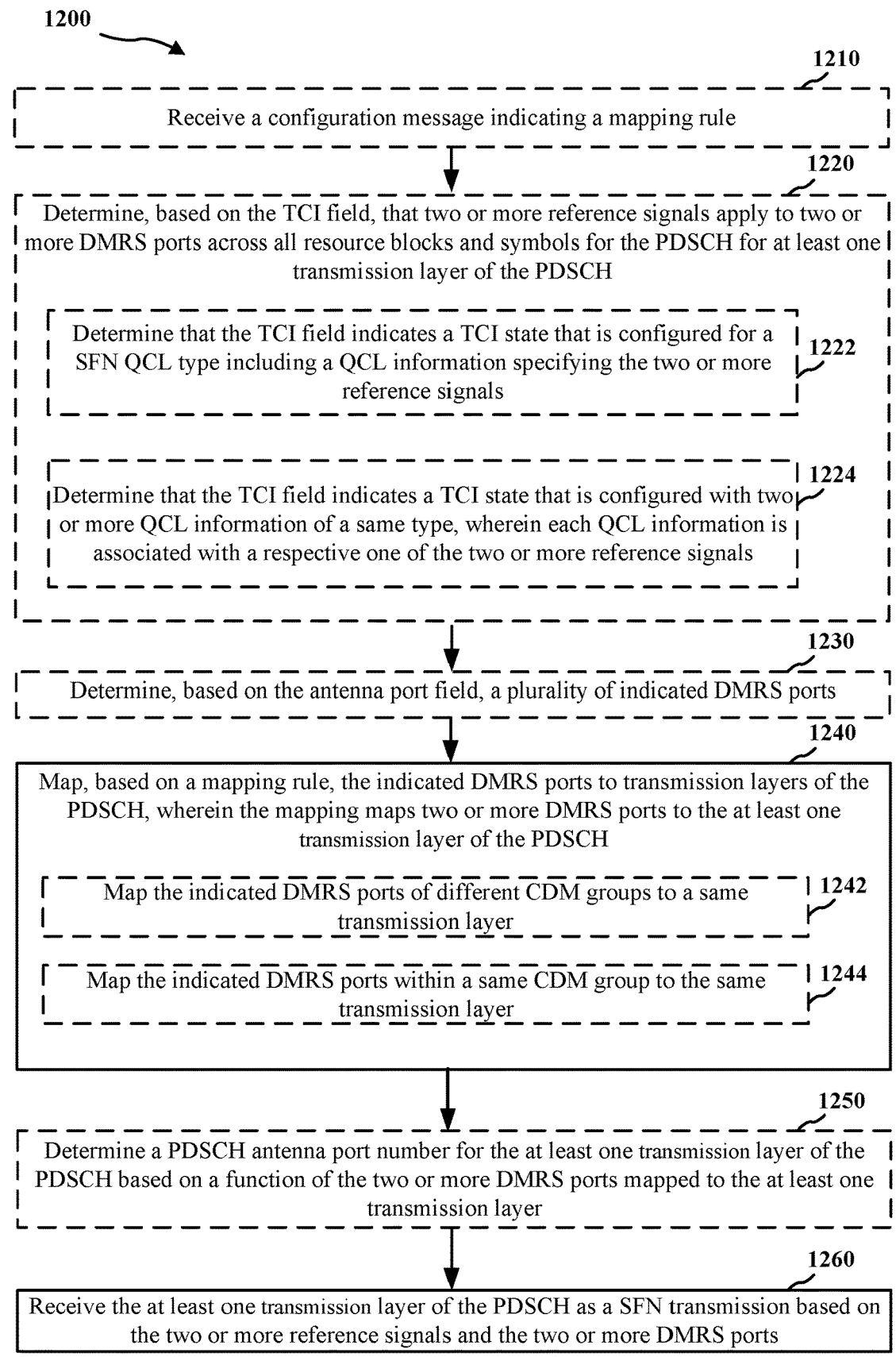
FIG. 12 is a flowchart of an example of a method of wireless communication for a UE.

FIG. 12 is a flowchart of an example method 1200 for receiving an SFN transmission. The method 1200 may be performed by a UE (such as the UE 104, which may include the memory 360 and which may be the entire UE 104 or a component of the UE 104 such as the SFN receiver component 140, TX processor 368, the RX processor 356, or the controller/processor 359). The method 1200 may be performed by the SFN receiver component 140 in communication with the SFN transmitter component 198 of the base station 102. Optional blocks are shown with dashed lines.

At block 1210, the method 1200 may optionally include receiving a configuration message indicating a mapping rule. In an aspect, for example, the UE 104, the RX processor 356 and/or the controller/processor 359 may execute the SFN receiver component 140 and/or the configuration component 142 to receive a configuration message (e.g., RRC message 710) indicating a mapping rule 714. Accordingly, the UE 104, the RX processor 356, and/or the controller/processor 359 executing the SFN receiver component 140 and/or the configuration component 142 may provide means for receiving a configuration message indicating a mapping rule.

At block 1220, the method 1200 may optionally include determining, based on the TCI field, that two or more reference signals apply to two or more DMRS ports across all resource blocks and symbols for the PDSCH for at least one transmission layer of the PDSCH. In an aspect, for example, the UE 104, the RX processor 356 and/or the controller/processor 359 may execute the SFN receiver component 140 and/or the DCI decoder 144 to determine, based on the TCI field 724, that two or more reference signals (e.g., RS 530, 532) apply to two or more DMRS ports across all resource blocks and symbols for the PDSCH 644 for at least one transmission layer of the PDSCH 644. For example, in sub-block 1222, the block 1220 may optionally include determining that the TCI field 724 indicates a TCI state that is configured for a SFN QCL type including a QCL information 1000 or 1010 specifying the two or more reference signals, as described above regarding FIG. 10. As another example, in sub-block 1224, the block 1220 may optionally include determining that the TCI field 724 indicates a TCI state 1100 or 1110 that is configured with two or more QCL information of a same type, wherein each QCL information is associated with a respective one of the two or more reference signals, as described above regarding FIG. 11. Accordingly, the UE 104, the RX processor 356, and/or the controller/processor 359 executing the SFN receiver component 140 and/or the DCI decoder 144 may provide means for determining, based on the TCI field, that two or more reference signals apply to two or more DMRS ports across all resource blocks and symbols for the PDSCH for at least one transmission layer of the PDSCH.

At block 1230, the method 1200 may optionally include determining, based on the antenna port field, a plurality of indicated DMRS ports. In an aspect, for example, the UE 104, the RX processor 356 and/or the controller/processor 359 may execute the SFN receiver component 140 and/or the mapping component 146 to determine, based on the antenna port field 726, a plurality of indicated DMRS ports. For example, the mapping component 146 may look up a value of the antenna port field 726 in a reference table to determine the plurality of indicated DMRS ports. The reference table may also indicate a number of CDM groups. The reference table may be defined in a standard or regulation, or signaled to the UE 104, e.g., via system information or RRC messaging. Accordingly, the UE 104, the RX processor 356, and/or the controller/processor 359 executing the SFN receiver component 140 and/or the configuration component 142 may provide means for determining, based on the antenna port field, a plurality of indicated DMRS ports.

At block 1240, the method 1200 may include mapping the indicated DMRS ports to transmission layers of the PDSCH. The mapping maps two or more DMRS ports to the at least one transmission layer of the PDSCH. In an aspect, for example, the UE 104, the RX processor 356 and/or the controller/processor 359 may execute the SFN receiver component 140 and/or the mapping component 146 to map the indicated DMRS ports 762 to transmission layers 764 of the PDSCH 730. The mapping maps two or more DMRS ports 762 to the at least one layer of the PDSCH. The mapping may be based on the mapping rule 714. For example, in sub-block 1242, according to the first mapping rule, the block 1240 may include mapping the indicated DMRS ports 762 of different CDM groups to a same transmission layer 764. In an implementation, the mapping component 146 may order the indicated DMRS ports within CDM groups. The mapping component 146 may then map the indicated DMRS ports with a same ordinal number within a respective CDM group to a transmission layer with a corresponding ordinal number. As another example, in sub-block 1244, according to the second mapping rule, the block 1240 may include mapping the indicated DMRS ports within a same CDM group to the same transmission layer 764. That is, each CDM group may correspond to a transmission layer. Accordingly, the UE 104, the RX processor 356, and/or the controller/processor 359 executing the SFN receiver component 140 and/or the configuration component 142 may provide means for mapping, based on a mapping rule, the indicated DMRS ports to transmission layers of the PDSCH, wherein the mapping maps two or more DMRS ports to the at least one layer of the PDSCH.

At block 1250, the method 1200 may optionally include determining a PDSCH antenna port number for the at least one layer of the PDSCH based on a function of the two or more DMRS ports mapped to the at least one layer. In an aspect, for example, the UE 104, the RX processor 356 and/or the controller/processor 359 may execute the SFN receiver component 140 and/or the mapping component 146 to determine a PDSCH antenna port number for the at least one layer 764 of the PDSCH 730 based on a function 766 of the two or more DMRS ports 762 mapped to the at least one transmission layer. For example, the function may be a function (e.g., DMRS port number+1000) of a lowest DMRS port number among the two or more DMRS ports mapped to the at least one transmission layer. In an aspect, a number of codewords for the PDSCH is based on a number of PDSCH antenna ports, which corresponds to a number of transmission layers. For example, if the number of antenna ports is greater than 4, the data layers may be mapped to two codewords for transmission of two transport blocks. If there are more than 4 antenna ports, the first $\lfloor n/2 \rfloor$ layers are mapped to the first codeword, and the remaining $\lceil n/2 \rceil$ layers are mapped to the second codeword. Accordingly, the UE 104, the RX processor 356, and/or the controller/processor 359 executing the SFN receiver component 140 and/or the configuration component 142 may provide means for determining a PDSCH antenna port number for the at least one layer of the PDSCH based on a function of the two or more DMRS ports mapped to the at least one layer.

At block 1260, the method 1200 may include receiving the at least one layer of the PDSCH as a SFN transmission based on the two or more reference signals and the two or more DMRS ports. In an aspect, for example, the UE 104, the RX processor 356 and/or the controller/processor 359 may execute the SFN receiver component 140 and/or the PDSCH receiver 148 to receive the at least one transmission layer 764 of the PDSCH 730 as a SFN transmission based on the two or more reference signals and the two or more DMRS ports 762. For example, receiving the PDSCH 730 may include determining the composite QCL 654 for the at least one layer based on the two or more reference signals and the two or more DMRS ports. Accordingly, the UE 104, the RX processor 356, and/or the controller/processor 359 executing the SFN receiver component 140 and/or the DCI decoder 144 may provide means for receiving the at least one layer of the PDSCH as a SFN transmission based on the two or more reference signals and the two or more DMRS ports.

Figure 13:
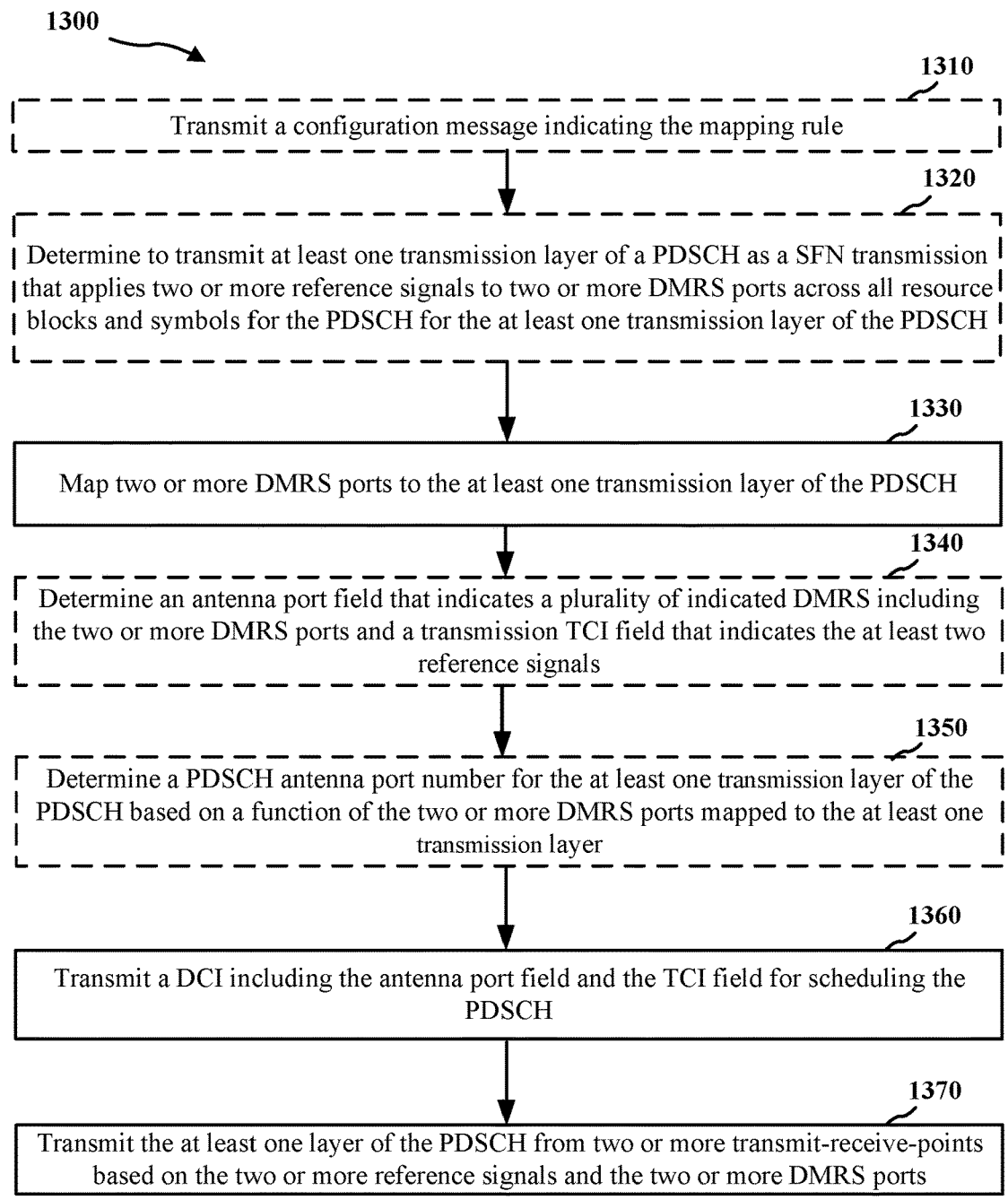
FIG. 13 is a flowchart of an example of a method of wireless communication for a base station.

FIG. 13 is a flowchart of an example method 1300 for transmitting a PDSCH as an SFN transmission. The method 1300 may be performed by a base station (such as the base station 102, which may include the memory 376 and which may be the entire base station 102 or a component of the base station 102 such as the SFN transmitter component 198, TX processor 316, the RX processor 370, or the controller/processor 375). The method 1300 may be performed by the SFN transmitter component 198 in communication with the SFN receiver component 140 of the UE 104. Optional blocks are shown with dashed lines.

At block 1310, the method 1300 may optionally include transmitting a configuration message indicating the mapping rule. In an aspect, for example, the base station 102, the controller/processor 375, and/or the RX processor 370 may execute the SFN transmitter component 198 and/or the configuration controller 740 to transmit a configuration message (e.g., RRC message 710) indicating the mapping rule 714. Accordingly, the base station 102, the controller/processor 375, and/or the RX processor 370 executing the SFN transmitter component 198 and/or the scheduler 741 may provide means for transmitting a configuration message indicating the mapping rule.

At block 1320, the method 1300 may optionally include determining to transmit at least one layer of a PDSCH as a SFN transmission that applies two or more reference signals to two or more DMRS ports across all resource blocks and symbols for the PDSCH for the at least one transmission layer of the PDSCH. In an aspect, for example, the base station 102, the controller/processor 375, and/or the TX processor 316 may execute the SFN transmitter component 198 and/or the scheduler 741 to determine to transmit at least one transmission layer 764 of a PDSCH 730 as a SFN transmission that applies two or more reference signals to two or more DMRS ports 762 across all resource blocks and symbols for the PDSCH 730 for the at least one transmission layer 764 of the PDSCH 730. Accordingly, the base station 102, the controller/processor 375, and/or the TX processor 316 executing the SFN transmitter component 198 and/or the scheduler 741 may provide means for determining to transmit at least one layer of a PDSCH as a SFN transmission that applies two or more reference signals to two or more DMRS ports across all resource blocks and symbols for the PDSCH for the at least one transmission layer of the PDSCH.

At block 1330, the method 1300 may include mapping two or more DMRS ports to the at least one layer of the PDSCH. In an aspect, for example, the base station 102, the controller/processor 375, and/or the TX processor 316 may execute the SFN transmitter component 198 and/or the scheduler 741 to map two or more DMRS ports to the at least one transmission layer 764 of the PDSCH 730. For example, the mapping may be based on the mapping rule 714. Accordingly, the base station 102, the controller/processor 375, and/or the TX processor 316 executing the SFN transmitter component 198 and/or the scheduler 741 may provide means for mapping, based on a mapping rule, two or more DMRS ports to the at least one layer of the PDSCH.

At block 1340, the method 1300 may optionally include determining an antenna port field that indicates a plurality of indicated DMRS ports including the two or more DMRS ports and a transmission TCI field that indicates the at least two reference signals. In an aspect, for example, the base station 102, the controller/processor 375, and/or the TX processor 316 may execute the SFN transmitter component 198 and/or the DCI generator 742 to determine an antenna port field 726 that indicates a plurality of indicated DMRS ports 762 including the two or more DMRS ports and a transmission TCI field that indicates the at least two reference signals. Accordingly, the base station 102, the controller/processor 375, and/or the TX processor 316 executing the SFN transmitter component 198 and/or the DCI generator 742 may provide means for determining an antenna port field that indicates a plurality of indicated DMRS including the two or more DMRS ports and a transmission TCI field that indicates the at least two reference signals.

At block 1350, the method 1300 may optionally include determining a PDSCH antenna port number for the at least one layer of the PDSCH based on a function of the two or more DMRS ports mapped to the at least one layer. In an aspect, for example, the base station 102, the controller/processor 375, and/or the TX processor 316 may execute the SFN transmitter component 198 and/or the DCI generator 742 to determine a PDSCH antenna port number for the at least one layer of the PDSCH based on a function 766 of the two or more DMRS ports 762 mapped to the at least one layer. Accordingly, the base station 102, the controller/processor 375, and/or the TX processor 316 executing the SFN transmitter component 198 and/or the DCI generator 742 may provide means for determining a PDSCH antenna port number for the at least one layer of the PDSCH based on a function of the two or more DMRS ports mapped to the at least one layer.

At block 1360, the method 1300 may include transmitting a DCI including the antenna port field and the TCI field for scheduling the PDSCH. In an aspect, for example, the base station 102, the controller/processor 375, and/or the TX processor 316 may execute the SFN transmitter component 198 and/or the DCI generator 742 to transmit a DCI 722 including the antenna port field 726 and the TCI field 724 for scheduling the PDSCH 730. For example, the DCI generator 742 may transmit the DCI 722 via the transmitter component 748. Accordingly, the base station 102, the controller/processor 375, and/or the TX processor 316 executing the SFN transmitter component 198 and/or the DCI generator 742 may provide means for transmitting a DCI including the antenna port field and the TCI field for scheduling the PDSCH.

At block 1370, the method 1300 may include transmitting the at least one layer of the PDSCH from two or more transmit-receive-points based on the two or more reference signals and the two or more DMRS ports. In an aspect, for example, the base station 102, the controller/processor 375, and/or the TX processor 316 may execute the SFN transmitter component 198 and/or the PDSCH generator 744 to transmit the at least one layer of the PDSCH 730 from two or more transmit-receive-points 732, 734 based on the two or more reference signals 630, 632 and the two or more DMRS ports 762. For example, the PDSCH generator 744 may transmit the PDSCH 730 via the transmitter component 748 and the TRPs 732, 734. Accordingly, the base station 102, the controller/processor 375, and/or the TX processor 316 executing the SFN transmitter component 198 and/or the PDSCH generator 744 may provide means for transmitting the at least one layer of the PDSCH from two or more transmit-receive-points based on the two or more reference signals and the two or more DMRS ports.

Some Further Example Clauses

Implementation examples are described in the following numbered clauses: Clauses
1. A method of wireless communication, comprising:
  receiving a downlink control information (DCI) including an antenna port field and a transmission configuration indication (TCI) field for scheduling a physical downlink shared channel (PDSCH), wherein the TCI field indicates that two or more reference signals apply to two or more demodulation reference signal (DMRS) ports across all resource blocks and symbols for the PDSCH for at least one transmission layer of the PDSCH and the antenna port field indicates a plurality of indicated DMRS ports;
  mapping the indicated DMRS ports to transmission layers of the PDSCH, wherein the mapping maps two or more DMRS ports to the at least one transmission layer of the PDSCH; and
  receiving the at least one transmission layer of the PDSCH as a single-frequency-network (SFN) transmission based on the two or more reference signals and the two or more DMRS ports.
2. The method of clause 1, wherein mapping the indicated DMRS ports to the transmission layers of the PDSCH comprises mapping the indicated DMRS ports of different code division multiplexing (CDM) groups to a same transmission layer.

3. The method of clause 2, wherein the mapping comprises:
  ordering the indicated DMRS ports within CDM groups; and
  mapping the indicated DMRS ports with a same ordinal number within a respective CDM group to a transmission layer with a corresponding ordinal number.
4. The method of any of clauses 1-3, wherein mapping the indicated DMRS ports to the transmission layers of the PDSCH comprises mapping the indicated DMRS ports within a same code division multiplexing (CDM) group to the same transmission layer.
5. The method of any of clauses 1-4, further comprising receiving a configuration message indicating a mapping rule defining a mapping between DMRS ports and transmission layers of the PDSCH.
6. The method of any of clauses 1-5, wherein the DCI indicates a mapping rule defining a mapping between DMRS ports and transmission layers of the PDSCH.
7. The method of clause 6, wherein the antenna port field or a dedicated field of the DCI indicates the mapping rule.
8. The method of any of clauses 1-7, further comprising determining a PDSCH antenna port number for the at least one transmission layer of the PDSCH based on a function of the two or more DMRS ports mapped to the at least one transmission layer.
9. The method of clause 8, wherein the function is a function of a lowest DMRS port number among the two or more DMRS ports mapped to the at least one transmission layer.
10. The method of clause 8, wherein a number of codewords for the PDSCH is based on a number of PDSCH antenna ports.
11. The method of any of clauses 1-10, wherein the PDSCH includes the at least one transmission layer of the PDSCH that is mapped to the two or more DMRS ports and a second transmission layer that is mapped to a single DMRS port.
12. The method of any of clauses 1-11, wherein the TCI field indicates a TCI state that is configured for a single-frequency-network (SFN) quasi-co-location (QCL) type including a QCL information specifying the two or more reference signals.
13. The method of any of clauses 1-11, wherein the TCI field indicates a TCI state that is configured with two or more quasi-co-location (QCL) information of a same type, wherein each QCL information is associated with a respective one of the two or more reference signals.
14. A method of wireless communication, comprising:
  mapping two or more demodulation reference signal (DMRS) ports to at least one transmission layer of a physical downlink shared channel (PDSCH) as a single-frequency-network (SFN) transmission that applies two or more reference signals to the two or more DMRS ports across all resource blocks and symbols for the PDSCH for the at least one transmission layer of the PDSCH;
  transmitting a downlink control information (DCI) for scheduling the PDSCH including an antenna port field that indicates a plurality of indicated DMRS ports including the two or more DMRS ports and a transmission configuration indication (TCI) field that indicates the two or more reference signals; and
  transmitting the at least one transmission layer of the PDSCH from two or more transmit-receive-points based on the two or more reference signals and the two or more DMRS ports.

15. The method of clause 14, wherein mapping the indicated DMRS ports to the at least one transmission layer of the PDSCH comprises mapping the indicated DMRS ports of different code division multiplexing (CDM) groups to a same transmission layer.

16. The method of clause 15, wherein the mapping comprises:
ordering the indicated DMRS ports within CDM groups; and
mapping the indicated DMRS ports with a same ordinal number within a respective CDM group to a transmission layer with a corresponding ordinal number.

17. The method of any of clauses 14-16, wherein mapping the indicated DMRS ports to the at least one transmission layer of the PDSCH comprises mapping the indicated DMRS ports within a same code division multiplexing (CDM) group to the same transmission layer.

18. The method of any of clauses 14-17, further comprising transmitting a configuration message indicating a mapping rule defining a mapping between DMRS ports and transmission layers of the PDSCH.

19. The method of any of clauses 14-17, wherein the DCI indicates a mapping rule defining a mapping between DMRS ports and transmission layers of the PDSCH.

20. The method of clause 19, wherein the antenna port field or a dedicated field of the DCI indicates the mapping rule.

21. The method of any of clauses 14-20, further comprising determining a PDSCH antenna port number for the at least one transmission layer of the PDSCH based on a function of the two or more DMRS ports mapped to the at least one transmission layer.

22. The method of clause 21, wherein the function is a function of a lowest DMRS port number among the two or more DMRS ports mapped to the at least one transmission layer.

23. The method of clause 21, wherein a number of codewords for the PDSCH is based on a number of PDSCH antenna ports.

24. The method of any of clauses 14-23, wherein the PDSCH includes the at least one transmission layer of the PDSCH that is mapped to the two or more DMRS ports and a second layer that is mapped to a single DMRS port.

25. The method of any of clauses 14-24, wherein the TCI field indicates a TCI state that is configured for a single-frequency-network (SFN) quasi-co-location (QCL) type including a QCL information specifying the two or more reference signals.

26. The method of any of clauses 14-24, wherein the TCI field indicates a TCI state that is configured with two or more quasi-co-location (QCL) information of a same type, wherein each QCL information is associated with a respective one of the two or more reference signals.

27. An apparatus for wireless communication, comprising:
a memory storing computer-executable instructions; and
at least one processor coupled to the memory and configured to execute the computer-executable instructions to:
receive a downlink control information (DCI) including an antenna port field and a transmission configuration indication (TCI) field for scheduling a physical downlink shared channel (PDSCH), wherein the TCI field indicates that two or more reference signals apply to two or more demodulation reference signal (DMRS) ports across all resource blocks and symbols for the PDSCH for at least one transmission layer of the PDSCH and the antenna port field indicates a plurality of indicated DMRS ports;
map the indicated DMRS ports to transmission layers of the PDSCH, wherein the mapping maps two or more DMRS ports to the at least one transmission layer of the PDSCH; and
receive the at least one transmission layer of the PDSCH as a single-frequency-network (SFN) transmission based on the two or more reference signals and the two or more DMRS ports.

28. The apparatus of clause 27, wherein the at least one processor is configured to map the indicated DMRS ports of different code division multiplexing (CDM) groups to a same transmission layer.

29. The apparatus of clause 28, wherein the at least one processor is configured to:
order the indicated DMRS ports within CDM groups; and
map the indicated DMRS ports with a same ordinal number within a respective CDM group to a transmission layer with a corresponding ordinal number.

30. The apparatus of any of clauses 27-29, wherein the at least one processor is configured to map the indicated DMRS ports within a same code division multiplexing (CDM) group to a same transmission layer.

31. The apparatus of any of clauses 27-30, wherein the at least one processor is configured to receive a configuration message indicating a mapping rule defining a mapping between DMRS ports and transmission layers of the PDSCH.

32. The apparatus of any of clauses 27-30, wherein the DCI indicates a mapping rule defining a mapping between DMRS ports and transmission layers of the PDSCH.

33. The apparatus of clause 32, wherein the antenna port field or a dedicated field of the DCI indicates the mapping rule.

34. The apparatus of any of clauses 27-33, further comprising determining a PDSCH antenna port number for the at least one transmission layer of the PDSCH based on a function of the two or more DMRS ports mapped to the at least one transmission layer.

35. The apparatus of clause 34, wherein the function is a function of a lowest DMRS port number among the two or more DMRS ports mapped to the at least one transmission layer.

36. The apparatus of clause 34, wherein a number of codewords for the PDSCH is based on a number of PDSCH antenna ports.

37. The apparatus of any of clauses 27-36, wherein the PDSCH includes the at least one transmission layer of the PDSCH that is mapped to the two or more DMRS ports and a second transmission layer that is mapped to a single DMRS port.

38. The apparatus of any of clauses 27-37, wherein the TCI field indicates a TCI state that is configured for a single-frequency-network (SFN) quasi-co-location (QCL) type including a QCL information specifying the two or more reference signals.

39. The apparatus of any of clauses 27-37, wherein the TCI field indicates a TCI state that is configured with two or more quasi-co-location (QCL) information of a same type, wherein each QCL information is associated with a respective one of the two or more reference signals.

40. An apparatus for wireless communication, comprising:
a memory storing computer-executable instructions; and at least one processor coupled to the memory and configured to execute the computer-executable instructions to:
  map two or more demodulation reference signal (DMRS) ports to at least one transmission layer of a physical downlink shared channel (PDSCH) as a single-frequency-network (SFN) transmission that applies two or more reference signals to the two or more DMRS ports across all resource blocks and symbols for the PDSCH for the at least one transmission layer of the PDSCH;
  transmit a downlink control information (DCI) for scheduling the PDSCH including an antenna port field that indicates a plurality of indicated DMRS ports including the two or more DMRS ports and a transmission configuration indication (TCI) field that indicates the two or more reference signals; and
  transmit the at least one transmission layer of the PDSCH from two or more transmit-receive-points based on the two or more reference signals and the two or more DMRS ports.

41. The apparatus of clause 40, wherein the at least one processor is configured to map the indicated DMRS ports of different code division multiplexing (CDM) groups to a same transmission layer.

42. The apparatus of clause 41, wherein the at least one processor is configured to:
  order the indicated DMRS ports within CDM groups; and
  map the indicated DMRS ports with a same ordinal number within a respective CDM group to a transmission layer with a corresponding ordinal number.

43. The apparatus of any of clauses 40-42, wherein the at least one processor is configured to map the indicated DMRS ports within a same code division multiplexing (CDM) group to a same transmission layer.

44. The apparatus of any of clauses 40-43, wherein the at least one processor is configured to transmit a configuration message indicating a mapping rule defining a mapping between DMRS ports and transmission layers of the PDSCH.

45. The apparatus of any of clauses 40-43, wherein the DCI indicates a mapping rule defining a mapping between DMRS ports and transmission layers of the PDSCH.

46. The apparatus of clause 45, wherein the antenna port field or a dedicated field of the DCI indicates the mapping rule.

47. The apparatus of any of clauses 40-46, wherein the at least one processor is configured to determine a PDSCH antenna port number for the at least one transmission layer of the PDSCH based on a function of the two or more DMRS ports mapped to the at least one transmission layer.

48. The apparatus of clause 47, wherein the function is a function of a lowest DMRS port number among the two or more DMRS ports mapped to the at least one transmission layer.

49. The apparatus of clause 47, wherein a number of codewords for the PDSCH is based on a number of PDSCH antenna ports.

50. The apparatus of any of clauses 40-49, wherein the PDSCH includes the at least one transmission layer of the PDSCH that is mapped to the two or more DMRS ports and a second layer that is mapped to a single DMRS port.

51. The apparatus of any of clauses 40-50, wherein the TCI field indicates a TCI state that is configured for a single-frequency-network (SFN) quasi-co-location (QCL) type including a QCL information specifying the two or more reference signals.

52. The apparatus of any of clauses 40-50, wherein the TCI field indicates a TCI state that is configured with two or more quasi-co-location (QCL) information of a same type, wherein each QCL information is associated with a respective one of the two or more reference signals.

53. An apparatus for wireless communication, comprising:
  means for receiving a downlink control information (DCI) including an antenna port field and a transmission configuration indication (TCI) field for scheduling a physical downlink shared channel (PDSCH), wherein the TCI field indicates that two or more reference signals apply to two or more demodulation reference signal (DMRS) ports across all resource blocks and symbols for the PDSCH for at least one transmission layer of the PDSCH and the antenna port field indicates a plurality of indicated DMRS ports;
  means for mapping the indicated DMRS ports to transmission layers of the PDSCH, wherein the mapping maps two or more DMRS ports to the at least one transmission layer of the PDSCH; and
  means for receiving the at least one transmission layer of the PDSCH as a single-frequency-network (SFN) transmission based on the two or more reference signals and the two or more DMRS ports.

54. The apparatus of clause 53, wherein the means for mapping the indicated DMRS ports to the transmission layers of the PDSCH is configured to map the indicated DMRS ports of different code division multiplexing (CDM) groups to a same transmission layer.

55. The apparatus of clause 54, wherein the means for mapping is configured to:
  order the indicated DMRS ports within CDM groups; and
  map the indicated DMRS ports with a same ordinal number within a respective CDM group to a transmission layer with a corresponding ordinal number.

56. The apparatus of any of clauses 53-55, wherein the means for mapping the indicated DMRS ports to the transmission layers of the PDSCH is configured to map the indicated DMRS ports within a same code division multiplexing (CDM) group to the same transmission layer.

57. The apparatus of any of clauses 53-56, further comprising means for receiving a configuration message indicating a mapping rule defining a mapping between DMRS ports and transmission layers of the PDSCH.

58. The apparatus of any of clauses 53-56, wherein the DCI indicates a mapping rule defining a mapping between DMRS ports and transmission layers of the PDSCH.

59. The apparatus of clause 58, wherein the antenna port field or a dedicated field of the DCI indicates the mapping rule.

60. The apparatus of any of clauses 53-59, further comprising means for determining a PDSCH antenna port number for the at least one transmission layer of the PDSCH based on a function of the two or more DMRS ports mapped to the at least one transmission layer.

61. The apparatus of clause 60, wherein the function is a function of a lowest DMRS port number among the two or more DMRS ports mapped to the at least one transmission layer.

62. The apparatus of clause 60, wherein a number of codewords for the PDSCH is based on a number of PDSCH antenna ports.

63. The apparatus of any of clauses 53-62, wherein the PDSCH includes the at least one transmission layer of the PDSCH that is mapped to the two or more DMRS ports and a second transmission layer that is mapped to a single DMRS port.

64. The apparatus of any of clauses 53-63, wherein the TCI field indicates a TCI state that is configured for a single-frequency-network (SFN) quasi-co-location (QCL) type including a QCL information specifying the two or more reference signals.

65. The apparatus of any of clauses 53-63, wherein the TCI field indicates a TCI state that is configured with two or more quasi-co-location (QCL) information of a same type, wherein each QCL information is associated with a respective one of the two or more reference signals.

66. An apparatus for wireless communication, comprising:
  means for mapping two or more demodulation reference signal (DMRS) ports to at least one transmission layer of a physical downlink shared channel (PDSCH) as a single-frequency-network (SFN) transmission that applies two or more reference signals to the two or more DMRS ports across all resource blocks and symbols for the PDSCH for the at least one transmission layer of the PDSCH;
  means for transmitting a downlink control information (DCI) for scheduling the PDSCH including an antenna port field that indicates a plurality of indicated DMRS ports including the two or more DMRS ports and a transmission configuration indication (TCI) field that indicates the two or more reference signals; and
  means for transmitting the at least one transmission layer of the PDSCH from two or more transmit-receive-points based on the two or more reference signals and the two or more DMRS ports.

67. The apparatus of clause 66, wherein the means for mapping the indicated DMRS ports to the at least one transmission layer of the PDSCH is configured to map the indicated DMRS ports of different code division multiplexing (CDM) groups to a same transmission layer.

68. The apparatus of clause 67, wherein the means for mapping is configured to:
  order the indicated DMRS ports within CDM groups; and
  map the indicated DMRS ports with a same ordinal number within a respective CDM group to a transmission layer with a corresponding ordinal number.

69. The apparatus of any of clauses 66-68, wherein the means for mapping the indicated DMRS ports to the at least one transmission layer of the PDSCH is configured to map the indicated DMRS ports within a same code division multiplexing (CDM) group to the same transmission layer.

70. The apparatus of any of clauses 66-69, further comprising means for transmitting a configuration message indicating a mapping rule defining a mapping between DMRS ports and transmission layers of the PDSCH.

71. The apparatus of any of clauses 66-69, wherein the DCI indicates a mapping rule defining a mapping between DMRS ports and transmission layers of the PDSCH.

72. The apparatus of clause 71, wherein the antenna port field or a dedicated field of the DCI indicates the mapping rule.

73. The apparatus any of clauses 66-72, further comprising means for determining a PDSCH antenna port number for the at least one transmission layer of the PDSCH based on a function of the two or more DMRS ports mapped to the at least one transmission layer.

74. The apparatus of clause 73, wherein the function is a function of a lowest DMRS port number among the two or more DMRS ports mapped to the at least one transmission layer.

75. The apparatus of clause 73, wherein a number of codewords for the PDSCH is based on a number of PDSCH antenna ports.

76. The apparatus of any of clauses 66-75, wherein the PDSCH includes the at least one transmission layer of the PDSCH that is mapped to the two or more DMRS ports and a second layer that is mapped to a single DMRS port.

77. The apparatus of any of clauses 66-76, wherein the TCI field indicates a TCI state that is configured for a single-frequency-network (SFN) quasi-co-location (QCL) type including a QCL information specifying the two or more reference signals.

78. The apparatus of any of clauses 66-76, wherein the TCI field indicates a TCI state that is configured with two or more quasi-co-location (QCL) information of a same type, wherein each QCL information is associated with a respective one of the two or more reference signals.

79. A non-transitory computer-readable medium storing computer executable code, the code when executed by a processor cause the processor to:
  receive a downlink control information (DCI) including an antenna port field and a transmission configuration indication (TCI) field for scheduling a physical downlink shared channel (PDSCH), wherein the TCI field indicates that two or more reference signals apply to two or more demodulation reference signal (DMRS) ports across all resource blocks and symbols for the PDSCH for at least one transmission layer of the PDSCH and the antenna port field indicates a plurality of indicated DMRS ports;
  map the indicated DMRS ports to transmission layers of the PDSCH, wherein the mapping maps two or more DMRS ports to the at least one transmission layer of the PDSCH; and
  receive the at least one transmission layer of the PDSCH as a single-frequency-network (SFN) transmission based on the two or more reference signals and the two or more DMRS ports.

80. The non-transitory computer-readable medium of clause 79, wherein the code to map includes code to map the indicated DMRS ports of different code division multiplexing (CDM) groups to a same transmission layer.

81. The non-transitory computer-readable medium of clause 80, wherein the code to map includes code to:
  order the indicated DMRS ports within CDM groups; and
  map the indicated DMRS ports with a same ordinal number within a respective CDM group to a transmission layer with a corresponding ordinal number.

82. The non-transitory computer-readable medium any of clauses 79-81, wherein the code to map includes code to map the indicated DMRS ports within a same code division multiplexing (CDM) group to a same transmission layer.

83. The non-transitory computer-readable medium of any of clauses 79-82, further comprising code to receive a configuration message indicating a mapping rule defining a mapping between DMRS ports and transmission layers of the PDSCH.

84. The non-transitory computer-readable medium of any of clauses 79-82, wherein the DCI indicates a mapping rule defining a mapping between DMRS ports and transmission layers of the PDSCH.

85. The non-transitory computer-readable medium of clause 84, wherein the antenna port field or a dedicated field of the DCI indicates the mapping rule.

86. The non-transitory computer-readable medium of any of clauses 79-85, further comprising code to determine a PDSCH antenna port number for the at least one transmission layer of the PDSCH based on a function of the two or more DMRS ports mapped to the at least one transmission layer.

87. The non-transitory computer-readable medium of clause 86, wherein the function is a function of a lowest DMRS port number among the two or more DMRS ports mapped to the at least one transmission layer.

88. The non-transitory computer-readable medium of clause 86, wherein a number of codewords for the PDSCH is based on a number of PDSCH antenna ports.

89. The non-transitory computer-readable medium of any of clauses 79-88, wherein the PDSCH includes the at least one transmission layer of the PDSCH that is mapped to the two or more DMRS ports and a second transmission layer that is mapped to a single DMRS port.

90. The non-transitory computer-readable medium of any of clauses 79-89, wherein the TCI field indicates a TCI state that is configured for a single-frequency-network (SFN) quasi-co-location (QCL) type including a QCL information specifying the two or more reference signals.

91. The non-transitory computer-readable medium of any of clauses 79-89, wherein the TCI field indicates a TCI state that is configured with two or more quasi-co-location (QCL) information of a same type, wherein each QCL information is associated with a respective one of the two or more reference signals.

92. A non-transitory computer-readable medium storing computer executable code, the code when executed by a processor causes the processor to:
  map two or more demodulation reference signal (DMRS) ports to at least one transmission layer of a physical downlink shared channel (PDSCH) as a single-frequency-network (SFN) transmission that applies two or more reference signals to the two or more DMRS ports across all resource blocks and symbols for the PDSCH for the at least one transmission layer of the PDSCH;
  transmit a downlink control information (DCI) for scheduling the PDSCH including an antenna port field that indicates a plurality of indicated DMRS ports including the two or more DMRS ports and a transmission configuration indication (TCI) field that indicates the two or more reference signals; and
  transmit the at least one transmission layer of the PDSCH from two or more transmit-receive-points based on the two or more reference signals and the two or more DMRS ports.

93. The non-transitory computer-readable medium of clause 92, wherein the code to map includes code to map the indicated DMRS ports of different code division multiplexing (CDM) groups to a same transmission layer.

94. The non-transitory computer-readable medium of clause 93, wherein the code to map includes code to:
  order the indicated DMRS ports within CDM groups; and
  map the indicated DMRS ports with a same ordinal number within a respective CDM group to a transmission layer with a corresponding ordinal number.

95. The non-transitory computer-readable medium of any of clauses 92-94, wherein the code to map includes code to map the indicated DMRS ports within a same code division multiplexing (CDM) group to a same transmission layer.

96. The non-transitory computer-readable medium of any of clauses 92-95, further comprising code to transmit a configuration message indicating a mapping rule defining a mapping between DMRS ports and transmission layers of the PDSCH.

97. The non-transitory computer-readable medium of any of clauses 92-95, wherein the DCI indicates a mapping rule defining a mapping between DMRS ports and transmission layers of the PDSCH.

98. The non-transitory computer-readable medium of clause 97, wherein the antenna port field or a dedicated field of the DCI indicates the mapping rule.

99. The non-transitory computer-readable medium of any of clauses 92-98, further comprising code to determine a PDSCH antenna port number for the at least one transmission layer of the PDSCH based on a function of the two or more DMRS ports mapped to the at least one transmission layer.

100. The non-transitory computer-readable medium of clause 99, wherein the function is a function of a lowest DMRS port number among the two or more DMRS ports mapped to the at least one transmission layer.

101. The non-transitory computer-readable medium of clause 99, wherein a number of codewords for the PDSCH is based on a number of PDSCH antenna ports.

102. The non-transitory computer-readable medium of any of clauses 92-101, wherein the PDSCH includes the at least one transmission layer of the PDSCH that is mapped to the two or more DMRS ports and a second layer that is mapped to a single DMRS port.

103. The non-transitory computer-readable medium of any of clauses 92-102, wherein the TCI field indicates a TCI state that is configured for a single-frequency-network (SFN) quasi-co-location (QCL) type including a QCL information specifying the two or more reference signals.

104. The non-transitory computer-readable medium of any of clauses 92-102, wherein the TCI field indicates a TCI state that is configured with two or more quasi-co-location (QCL) information of a same type, wherein each QCL information is associated with a respective one of the two or more reference signals.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication, comprising:
receiving a downlink control information (DCI) including an antenna port field and a transmission configuration indication (TCI) field for scheduling a physical downlink shared channel (PDSCH), wherein the TCI field indicates that two or more reference signals apply to two or more demodulation reference signal (DMRS) ports across all resource blocks and symbols for the PDSCH for at least one transmission layer of the PDSCH and the antenna port field indicates a plurality of indicated DMRS ports;
mapping the indicated DMRS ports to transmission layers of the PDSCH, wherein the mapping maps two or more DMRS ports to the at least one transmission layer of the PDSCH; and
receiving the at least one transmission layer of the PDSCH as a single-frequency-network (SFN) transmission based on the two or more reference signals and the two or more DMRS ports.

2. The method of claim 1, wherein mapping the indicated DMRS ports to the transmission layers of the PDSCH comprises mapping the indicated DMRS ports of different code division multiplexing (CDM) groups to a same transmission layer.

3. The method of claim 2, wherein the mapping comprises:
ordering the indicated DMRS ports within CDM groups; and
mapping the indicated DMRS ports with a same ordinal number within a respective CDM group to a transmission layer with a corresponding ordinal number.

4. The method of claim 1, wherein mapping the indicated DMRS ports to the transmission layers of the PDSCH comprises mapping the indicated DMRS ports within a same code division multiplexing (CDM) group to the same transmission layer.

5. The method of claim 1, further comprising receiving a configuration message indicating a mapping rule defining a mapping between DMRS ports and transmission layers of the PDSCH.

6. The method of claim 1, wherein the DCI indicates a mapping rule defining a mapping between DMRS ports and transmission layers of the PDSCH.

7. The method of claim 6, wherein the antenna port field or a dedicated field of the DCI indicates the mapping rule.

8. The method of claim 1, further comprising determining a PDSCH antenna port number for the at least one transmission layer of the PDSCH based on a function of the two or more DMRS ports mapped to the at least one transmission layer.

9. The method of claim 8, wherein the function is a function of a lowest DMRS port number among the two or more DMRS ports mapped to the at least one transmission layer.

10. The method of claim 8, wherein a number of codewords for the PDSCH is based on a number of PDSCH antenna ports.

11. The method of claim 1, wherein the PDSCH includes the at least one transmission layer of the PDSCH that is mapped to the two or more DMRS ports and a second transmission layer that is mapped to a single DMRS port.

12. The method of claim 1, wherein the TCI field indicates a TCI state that is configured for a single-frequency-network (SFN) quasi-co-location (QCL) type including a QCL information specifying the two or more reference signals.

13. The method of claim 1, wherein the TCI field indicates a TCI state that is configured with two or more quasi-co-location (QCL) information of a same type, wherein each QCL information is associated with a respective one of the two or more reference signals.

14. A method of wireless communication, comprising:
mapping two or more demodulation reference signal (DMRS) ports to at least one transmission layer of a physical downlink shared channel (PDSCH) as a single-frequency-network (SFN) transmission that applies two or more reference signals to the two or more DMRS ports across all resource blocks and symbols for the PDSCH for the at least one transmission layer of the PDSCH;
transmitting a downlink control information (DCI) for scheduling the PDSCH including an antenna port field that indicates a plurality of indicated DMRS ports including the two or more DMRS ports and a transmission configuration indication (TCI) field that indicates the two or more reference signals; and
transmitting the at least one transmission layer of the PDSCH from two or more transmit-receive-points based on the two or more reference signals and the two or more DMRS ports.

15. The method of claim 14, wherein mapping the indicated DMRS ports to the at least one transmission layer of the PDSCH comprises mapping the indicated DMRS ports of different code division multiplexing (CDM) groups to a same transmission layer.

16. The method of claim 15, wherein the mapping comprises:
ordering the indicated DMRS ports within CDM groups; and
mapping the indicated DMRS ports with a same ordinal number within a respective CDM group to a transmission layer with a corresponding ordinal number.

17. The method of claim 14, wherein mapping the indicated DMRS ports to the at least one transmission layer of the PDSCH comprises mapping the indicated DMRS ports within a same code division multiplexing (CDM) group to the same transmission layer.

18. The method of claim 14, further comprising transmitting a configuration message indicating a mapping rule defining a mapping between DMRS ports and transmission layers of the PDSCH.

19. The method of claim 14, wherein the DCI indicates a mapping rule defining a mapping between DMRS ports and transmission layers of the PDSCH.

20. The method of claim 19, wherein the antenna port field or a dedicated field of the DCI indicates the mapping rule.

21. The method of claim 14, further comprising determining a PDSCH antenna port number for the at least one transmission layer of the PDSCH based on a function of the two or more DMRS ports mapped to the at least one transmission layer.

22. The method of claim 21, wherein the function is a function of a lowest DMRS port number among the two or more DMRS ports mapped to the at least one transmission layer.

23. The method of claim 21, wherein a number of codewords for the PDSCH is based on a number of PDSCH antenna ports.

24. The method of claim 14, wherein the PDSCH includes the at least one transmission layer of the PDSCH that is mapped to the two or more DMRS ports and a second layer that is mapped to a single DMRS port.

25. The method of claim 14, wherein the TCI field indicates a TCI state that is configured for a single-frequency-network (SFN) quasi-co-location (QCL) type including a QCL information specifying the two or more reference signals.

26. The method of claim 14, wherein the TCI field indicates a TCI state that is configured with two or more quasi-co-location (QCL) information of a same type, wherein each QCL information is associated with a respective one of the two or more reference signals.

27. An apparatus for wireless communication, comprising:
a memory storing computer-executable instructions; and
at least one processor coupled to the memory and configured to execute the computer-executable instructions to:
receive a downlink control information (DCI) including an antenna port field and a transmission configuration indication (TCI) field for scheduling a physical downlink shared channel (PDSCH), wherein the TCI field indicates that two or more reference signals apply to two or more demodulation reference signal (DMRS) ports across all resource blocks and symbols for the PDSCH for at least one transmission layer of the PDSCH and the antenna port field indicates a plurality of indicated DMRS ports;
map, based on a mapping rule, the indicated DMRS ports to transmission layers of the PDSCH, wherein the mapping maps two or more DMRS ports to the at least one transmission layer of the PDSCH; and
receive the at least one transmission layer of the PDSCH as a single-frequency-network (SFN) transmission based on the two or more reference signals and the two or more DMRS ports.

28. The apparatus of claim 27, wherein the at least one processor is configured to map the indicated DMRS ports of different code division multiplexing (CDM) groups to a same transmission layer.

29. An apparatus for wireless communication, comprising:
a memory storing computer-executable instructions; and
at least one processor coupled to the memory and configured to execute the computer-executable instructions to:
map two or more two or more demodulation reference signal (DMRS) ports to at least one transmission layer of a physical downlink shared channel (PDSCH) as a single-frequency-network (SFN) transmission that applies two or more reference signals to the two or more DMRS ports across all resource blocks and symbols for the PDSCH for the at least one transmission layer of the PDSCH;
transmit a downlink control information (DCI) for scheduling the PDSCH including an antenna port field that indicates a plurality of indicated DMRS ports including the two or more DMRS ports and a transmission configuration indication (TCI) field that indicates the two or more reference signals; and
transmit the at least one transmission layer of the PDSCH from two or more transmit-receive-points based on the two or more reference signals and the two or more DMRS ports.

30. The apparatus of claim 29, wherein the at least one processor is configured to map the indicated DMRS ports of different code division multiplexing (CDM) groups to a same transmission layer.

* * * * *